（12） United States Patent
Ooishi

(10) Patent No.: US 10,609,801 B2
(45) Date of Patent: Mar. 31, 2020

(54) ANTISTATIC FILM AND LIQUID CRYSTAL DISPLAY DEVICE

(71) Applicant: ZEON CORPORATION, Chiyoda-ku, Tokyo (JP)

(72) Inventor: Hitoshi Ooishi, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/518,486

(22) PCT Filed: Oct. 15, 2015

(86) PCT No.: PCT/JP2015/079213
§ 371 (c)(1),
(2) Date: Apr. 12, 2017

(87) PCT Pub. No.: WO2016/063793
PCT Pub. Date: Apr. 28, 2016

(65) Prior Publication Data
US 2017/0238403 A1    Aug. 17, 2017

(30) Foreign Application Priority Data

Oct. 23, 2014  (JP) .................................. 2014-216506

(51) Int. Cl.
*H05F 1/00* (2006.01)
*B32B 7/02* (2019.01)
(Continued)

(52) U.S. Cl.
CPC ................. *H05F 1/00* (2013.01); *B32B 7/02* (2013.01); *B32B 27/00* (2013.01); *B32B 27/18* (2013.01);
(Continued)

(58) Field of Classification Search
CPC ... H05F 1/00; B32B 2307/21; G02F 2202/22; G02F 1/134363; G02B 1/16
See application file for complete search history.

(56) References Cited

U.S. PATENT DOCUMENTS

| | | |
|---|---|---|
| 5,344,900 A | 9/1994 | Maezawa et al. |
| 2002/0008840 A1 | 1/2002 | Sakamaki et al. |

(Continued)

FOREIGN PATENT DOCUMENTS

| | | |
|---|---|---|
| CN | 101025443 A | 8/2007 |
| CN | 102834743 A | 12/2012 |

(Continued)

OTHER PUBLICATIONS

Apr. 25, 2017, International Preliminary Report on Patentability issued in the International Patent Application No. PCT/JP2015/079213.

(Continued)

*Primary Examiner* — Jessica M Merlin
(74) *Attorney, Agent, or Firm* — Kenja IP Law PC

(57) ABSTRACT

An antistatic film including: a substrate film made of a thermoplastic resin containing a polymer including an alicyclic structure; and an antistatic layer provided on the substrate film, the layer containing electroconductive metal oxide particles, wherein the antistatic layer has a surface resistance of $1.0 \times 10^6$ Ω/sq. or more and $1.0 \times 10^{10}$ Ω/sq. or less, and the antistatic film has a haze value of 0.3% or less.

12 Claims, 1 Drawing Sheet

(51) Int. Cl.
*C08L 101/02* (2006.01)
*B32B 27/18* (2006.01)
*C08K 5/00* (2006.01)
*G09F 9/00* (2006.01)
*B32B 27/00* (2006.01)
*G02B 5/30* (2006.01)
*G02B 1/16* (2015.01)
*G02F 1/1343* (2006.01)
*G02F 1/1335* (2006.01)

(52) U.S. Cl.
CPC .............. *C08K 5/00* (2013.01); *C08L 101/02* (2013.01); *G02B 1/16* (2015.01); *G02B 5/305* (2013.01); *G02F 1/134363* (2013.01); *G09F 9/00* (2013.01); *B32B 2307/21* (2013.01); *G02F 1/133528* (2013.01); *G02F 2202/22* (2013.01); *G02F 2202/28* (2013.01)

(56) References Cited

U.S. PATENT DOCUMENTS

| | | | |
|---|---|---|---|
| 2004/0022965 A1 | 2/2004 | Sakamaki et al. | |
| 2007/0212498 A1* | 9/2007 | Fukushige | C08J 3/243 428/1.31 |
| 2008/0198446 A1 | 8/2008 | Asakura et al. | |
| 2010/0103352 A1* | 4/2010 | Suzuki | B29C 47/8845 349/96 |
| 2010/0254003 A1* | 10/2010 | Higashikawa | G02B 1/11 359/488.01 |
| 2011/0317239 A1* | 12/2011 | Mori | C08G 77/14 359/241 |
| 2012/0225283 A1 | 9/2012 | Uchimura et al. | |
| 2013/0027641 A1* | 1/2013 | Kodama | G02B 5/0221 349/96 |
| 2013/0169912 A1* | 7/2013 | Ooishi | G02B 5/3083 349/96 |
| 2014/0106122 A1* | 4/2014 | Eguchi | G02B 5/3025 428/142 |
| 2014/0141223 A1* | 5/2014 | Yoda | B32B 27/18 428/216 |
| 2016/0252774 A1* | 9/2016 | Kawamura | G02B 5/3025 349/96 |

FOREIGN PATENT DOCUMENTS

| | | |
|---|---|---|
| JP | S5083482 A | 7/1975 |
| JP | H02113920 A | 4/1990 |
| JP | H0314882 A | 1/1991 |
| JP | H03122137 A | 5/1991 |
| JP | H03182701 A | 8/1991 |
| JP | H0463807 A | 2/1992 |
| JP | 2000009912 A | 1/2000 |
| JP | 2002022944 A | 1/2002 |
| JP | 2002086554 A | 3/2002 |
| JP | 2002329598 A | 11/2002 |
| JP | 2005181615 A | 7/2005 |
| JP | 2006181731 A | 7/2006 |
| JP | 2008233882 A | 10/2008 |
| JP | 2011012210 A | 1/2011 |
| JP | 2012194548 A | 10/2012 |
| JP | 2012236921 A | 12/2012 |
| TW | 201307064 A | 2/2013 |

OTHER PUBLICATIONS

Dec. 28, 2015, International Search Report issued in the International Patent Application No. PCT/JP2015/079213.

* cited by examiner

ANTISTATIC FILM AND LIQUID CRYSTAL DISPLAY DEVICE

FIELD

The present invention relates to an antistatic film and a liquid crystal display device including the antistatic film.

BACKGROUND

Antistatic films having an antistatic function have been developed for years (see Patent Literature 1 to 3).

CITATION LIST

Patent Literature

Patent Literature 1: Japanese Patent Application Laid-Open No. 2002-329598 A
Patent Literature 2: Japanese Patent Application Laid-Open No. 2011-12210 A
Patent Literature 3: Japanese Patent Application Laid-Open No. 2012-236921 A

SUMMARY

Technical Problem

Liquid crystal display devices offer advantages such as high image quality, thinness, light-weightness, and low power consumption and have a wide range of applications such as televisions, personal computers, and car navigation systems. A liquid crystal display device includes a liquid crystal cell between two polarizers (for example, an input polarizer and an output polarizer) arranged such that their transmission axes are orthogonal to each other. Application of a voltage to the liquid crystal cell changes the orientation of liquid crystal molecules and causes an image to appear on the screen.

In recent years, liquid crystal display devices each having a touch panel have widely been used in portable terminals, such as mobile phones and tablet personal computers. Touching the touch panel of a liquid crystal display device by a user may cause charges to be accumulated in components that constitute the liquid crystal display device. The charges thus accumulated may disturb drive control of liquid crystal molecules in the liquid crystal cell. To suppress accumulation of these charges, an antistatic film may be provided on the liquid crystal display device.

To effectively suppress the disturbance of the drive control of liquid crystal molecules in the liquid crystal cell and achieve good image quality, the antistatic film is usually provided over the entire display area of the liquid crystal display device. Thus, the user views an image displayed on the liquid crystal display device through the antistatic film. Therefore, the antistatic film preferably has high transparency. Specifically, the antistatic film preferably has a low haze value.

The recent increasing demand for high image quality leads to a growing need for antistatic films having high transparency. However, the antistatic films as disclosed in Patent Literatures 1 to 3 fail to have sufficiently high transparency to meet the recent high level of requirement.

For example, the antistatic films disclosed in Patent Literatures 1 and 2 have a haze value of about 1.0% or about 0.5%. However, these antistatic films fail to have a haze value of 0.3% or less, that is, fail to have high transparency.

According to the studies carried out by the inventor of the present invention, the antistatic film disclosed in Patent Literature 3 can have a low haze value in a central portion of the film. However, this antistatic film has a high haze value near the edges of the film, that is, fails to have high transparency.

The present invention has been made in light of the aforementioned problems. An object of the present invention is to provide an antistatic film having both high transparency and good antistatic properties and to provide a liquid crystal display device including the antistatic film.

Solution to Problem

The inventor has diligently carried out studies to solve the aforementioned problems. As a result, the inventor has found that both high transparency and good antistatic properties are achieved by an antistatic film including a substrate film made of a thermoplastic resin containing a polymer including an alicyclic structure, and an antistatic layer provided on the substrate film and containing electroconductive metal oxide particles, wherein the antistatic layer has a surface resistance in a specific range, and the antistatic film has a haze value in a specific range, thereby completing the present invention.

That is, the present invention is as described below.
(1) An antistatic film comprising:
 a substrate film made of a thermoplastic resin containing a polymer including an alicyclic structure; and
 an antistatic layer provided on the substrate film, the layer containing electroconductive metal oxide particles,
 wherein the antistatic layer has a surface resistance of $1.0 \times 10^6$ Ω/sq. or more and $1.0 \times 10^{10}$ Ω/sq. or less, and
 the antistatic film has a haze value of 0.3% or less.
(2) The antistatic film according to (1), wherein
 the antistatic layer has a monolayer structure, and the antistatic layer has a thickness of 1.5 μm to 10.0 μm.
(3) The antistatic film according to (1) or (2), wherein the antistatic film has a transmission hue L* of 94 to 97.
(4) The antistatic film according to any one of (1) to (3), wherein the antistatic layer has a refractive index of 1.50 to 1.55.
(5) The antistatic film according to any one of (1) to (4), wherein
 the substrate film includes a first surface layer, an intermediate layer, and a second surface layer in this order,
 the intermediate layer contains an ultraviolet absorber,
 the substrate film has a thickness of 10 μm or more and 60 μm or less, and
 the substrate film has a light transmittance of 10% or less at a wavelength of 380 nm.
(6) The antistatic film according to any one of (1) to (5), wherein
 the number of fractures each of which having an area of 5 mm² or larger of the antistatic layer in both regions within 50 mm from edges of the antistatic layer in an application width direction is less than 10 per both the regions each having 1 meter length.
(7) A liquid crystal display device comprising:
 a liquid crystal cell;
 a polarizer provided on a viewing side of the liquid crystal cell; and
 the antistatic film according to any one of (1) to (6) provided on a viewing side of the polarizer,
 wherein the antistatic film includes the substrate film and the antistatic layer in this order from the proximity of the polarizer.

(8) The liquid crystal display device according to (7), comprising an ultraviolet-curable adhesive agent layer between the polarizer and the antistatic film.

(9) The liquid crystal display device according to (7) or (8), wherein the liquid crystal cell is an IPS liquid crystal cell.

Advantageous Effects of Invention

The present invention provides an antistatic film having both high transparency and good antistatic properties and provides a liquid crystal display device including the antistatic film.

DESCRIPTION OF EMBODIMENTS

Figure 1:
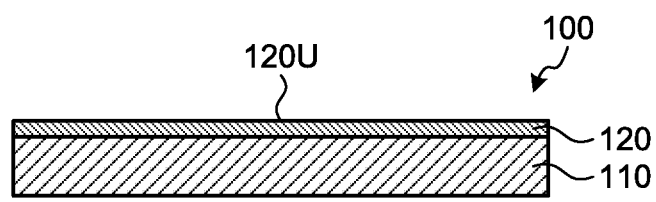
FIG. 1 is a cross-sectional view schematically illustrating an example of an antistatic film according to the present invention.

The present invention will be described below in detail by way of embodiments and examples. The present invention is not limited to the embodiments and the examples described below and may be freely modified and practiced without departing from the scope of claims of the present invention and the scope of their equivalents.

In the following description, the "long-length" film refers to a film having a length of 5 or more times the width, preferably 10 or more times the width, specifically, a film having a length long enough to store or transport it in a rolled form.

In the following description, the in-plane retardation Re of the film is a value represented by $Re=(nx-ny)\times d$ unless otherwise specified. The retardation Rth of the film in the thickness direction is a value represented by $Rth=\{(nx+ny)/2-nz\}\times d$ unless otherwise specified. In the formulas, nx represents a refractive index of the film in the direction that is perpendicular to the thickness direction of the film (in-plane direction) and that gives the maximum refractive index. In the formulas, ny represents a refractive index of the film in the direction that is the in-plane direction of the film and is orthogonal to the direction of nx. In addition, nz represents a refractive index of the film in the thickness direction, and d represents the thickness of the film. The measurement wavelength is 550 nm unless otherwise specified.

In the following description, "(meth)acrylate" encompasses both "acrylate" and "methacrylate", and a "(meth)acryloyl group" encompasses both an "acryloyl group" and a "methacryloyl group".

In the following description, "parallel", "perpendicular", and "orthogonal" directions of elements may include an error within a range in which advantageous effects of the present invention are not impaired, for example, an error within ±5°, unless otherwise specified.

In the following description, the lengthwise direction of a long-length film is usually parallel to the flow direction of the film in a production line.

In the following description, a "polarizing plate" and a "quarter-wave plate" encompass not only a rigid component but also a flexible component such as a resin film unless otherwise specified.

In the following description, an angle between the optical axes of films (for example, the transmission axis of a polarizer, the slow axis of a phase difference film) in a component including the films refers to an angle as viewed in the thickness direction of the films unless otherwise specified.

In the following description, an adhesive agent encompasses not only the adhesive in a narrow sense but also a sticky agent having a shear storage elastic modulus of less than 1 MPa at 23° C. unless otherwise specified. The term the "adhesive in a narrow sense" refers to an adhesive agent that has a shear storage elastic modulus of 1 MPa to 500 MPa at 23° C. after energy-ray irradiation or heat treatment.

In the following description, the slow axis of a film refers to the in-plane slow axis of the film unless otherwise specified.

[1. Overview of Antistatic Film]

FIG. 1 is a cross-sectional view schematically illustrating an example of an antistatic film according to the present invention.

As illustrated in FIG. 1, an antistatic film 100 of the present invention includes a substrate film 110 and an antistatic layer 120 provided on the substrate film 110. The antistatic layer 120 has a surface resistance in a specific range. The antistatic film 100 of the present invention has a low haze value. This configuration allows the antistatic film 100 of the present invention to exert both high transparency and good antistatic properties. In the antistatic film 100, the antistatic layer 120 may be an outermost layer so as to have an exposed surface 120U. Alternatively, an optional layer may be provided on the antistatic layer 120.

[2. Substrate Film]

The substrate film is made of a thermoplastic resin containing a polymer having an alicyclic structure. The polymer having an alicyclic structure includes a structural unit having an alicyclic structure. The polymer having an alicyclic structure may have an alicyclic structure in its main chain or may have an alicyclic structure in its side chain. In particular, a polymer having an alicyclic structure in its main chain is preferable from the viewpoint of mechanical strength and heat resistance.

Examples of the alicyclic structure may include a saturated alicyclic hydrocarbon (cycloalkane) structure, and an unsaturated alicyclic hydrocarbon (cycloalkene, cycloalkyne) structure. In particular, a cycloalkane structure and a cycloalkene structure are preferable, and a cycloalkane structure is particularly preferable from the viewpoint of, for example, mechanical strength and heat resistance.

The number of carbon atoms that form the alicyclic structure is preferably 4 or more, and more preferably 5 or more, and is preferably 30 or less, more preferably 20 or less, and particularly preferably 15 or less per alicyclic structure. When the number of carbon atoms that form the alicyclic structure is in this range, the thermoplastic resin containing a polymer having the alicyclic structure has a good balance of mechanical strength, heat resistance, and moldability.

In the polymer having an alicyclic structure, the ratio of the structural unit having an alicyclic structure may be appropriately set according to the intended use. The ratio of the structural unit having an alicyclic structure in the polymer having the alicyclic structure is preferably 55% by weight or more, more preferably 70% by weight or more, and particularly preferably 90% by weight or more. When the ratio of the structural unit having an alicyclic structure in the polymer having an alicyclic structure is in this range, the thermoplastic resin containing the polymer having an alicyclic structure has high transparency and good heat resistance.

Examples of the polymer having an alicyclic structure may include a norbornene-based polymer, a monocyclic cycloolefin-based polymer, a cyclic conjugated diene-based polymer, and hydrogenated products thereof. Among these polymers, a norbornene-based polymer is particularly preferable because of its good moldability. As the polymer having an alicyclic structure, one type thereof may be used alone, and two or more types thereof may also be used in combination at any ratio.

Examples of the norbornene-based polymer to be used may include those described in Japanese Patent Application Laid-Open Nos. Hei. 3-14882 A, Hei. 3-122137 A, and Hei. 4-63807 A. Specific examples of the norbornene-based polymer may include a ring-opened polymer of a monomer having a norbornene structure, and a hydrogenated product thereof; an addition polymer of a monomer having a norbornene structure, and a hydrogenated product thereof; and modified products thereof. In the following description, a monomer having a norbornene structure may be referred to as a "norbornene-based monomer". Examples of the ring-opened polymer including a norbornene-based monomer may include a ring-opened homopolymer formed from one type of monomer having a norbornene structure, a ring-opened copolymer formed from two or more types of monomers having a norbornene structure, and a ring-opened copolymer formed from a norbornene-based monomer and another monomer copolymerizable therewith. Examples of the addition polymer of the norbornene-based monomer may include an addition homopolymer formed from one type of monomer having a norbornene structure, an addition copolymer formed from two or more types of monomers having a norbornene structure, and an addition copolymer formed from a norbornene-based monomer and another monomer copolymerizable therewith. Among these polymers, the hydrogenated product of the ring-opened polymer of a norbornene-based monomer is particularly preferable from the viewpoint of, for example, moldability, heat resistance, low hygroscopicity, size stability, and light-weightness.

Examples of the norbornene-based monomer may include norbornene; an alkyl-substituted derivative of norbornene; an alkylidene-substituted derivative of norbornene; an aromatic-substituted derivative of norbornene; and polar group-substituted products thereof. Examples of the polar group may include halogens, a hydroxyl group, an ester group, an alkoxy group, a cyano group, an amide group, an imide group, and a silyl group. One type thereof may be used alone, and two or more types thereof may also be used in combination at any ratio. Specific examples of such a norbornene-based monomer may include 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, 5-hexyl-2-norbornene, 5-octyl-2-norbornene, and 5-octadecyl-2-norbornene.

Examples of the norbornene-based monomer may also include a monomer in which one or more cyclopentadienes are added to norbornene; an alkyl-substituted derivative of the monomer; an alkylidene-substituted derivative of the monomer; an aromatic-substituted derivative of the monomer; and polar group-substituted derivatives thereof. Specific examples of such a norbornene-based monomer may include 1,4:5,8-dimethano-1,2,3,4,4a,5,8,8a-2,3-cyclopentadienooctahydronaphthalene, 6-methyl-1,4:5,8-dimethano-1,4,4a,5,6,7,8,8a-octahydronaphthalene, and 1,4:5,10:6,9-trimethano-1,2,3,4,4a,5,5a,6,9,9a,10,10a-dodecahydro-2,3-cyclopentadienoanthracene.

Examples of the norbornene-based monomer may further include a monomer having a polycyclic structure, which is a cyclopentadiene multimer; an alkyl-substituted derivative of the monomer; an alkylidene-substituted derivative of the monomer; an aromatic-substituted derivative of the monomer; and polar group-substituted derivatives thereof. Specific examples of such a norbornene-based monomer may include dicyclopentadiene and 2,3-dihydrodicyclopentadiene.

Examples of the norbornene-based monomer may further include an adduct of cyclopentadiene with tetrahydroindene; an alkyl-substituted derivative of this adduct; an alkylidene-substituted derivative of this adduct; an aromatic-substituted derivative of this adduct; and polar group-substituted products thereof. Specific examples of such a norbornene-based monomer may include 1,4-methano-1,4,4a,4b,5,8,8a,9a-octahydrofluorene, and 5,8-methano-1,2,3,4,4a,5,8,8a-octahydro-2,3-cyclopentadienonaphthalene.

As the norbornene-based monomer, one type thereof may be used alone, and two or more types thereof may also be used in combination at any ratio.

Among norbornene-based polymers, a norbornene-based polymer that satisfies requirements (i) to (iii) described below is preferable.

(i) The norbornene-based polymer includes, as structural units, X: a bicyclo[3.3.0]octane-2,4-diyl-ethylene structure and Y: a tricyclo[4.3.0.1$^{2,5}$]decane-7,9-diyl-ethylene structure.

(ii) The amount of the structural units X and Y is 90% by weight or more relative to the total structural units of the norbornene-based polymer.

(iii) The ratio of the amount of the structural unit X relative to the amount of the structural unit Y is 100:0 to 40:60 in terms of the weight ratio of X:Y.

The use of such a polymer provides a substrate film having stable optical properties without a size change for a long period of time.

Examples of the monomer having the structure X as a structural unit may include a norbornene-based monomer having a structure in which a five-membered ring is bonded to a norbornene ring. Specific examples thereof may include tricyclo[4.3.0.1$^{2,5}$]deca-3,7-diene (common name: dicyclopentadiene) and a derivative thereof (a derivative having a substituent on its ring), and 7,8-benzotricyclo [4.3.0.1$^{2,5}$] deca-3-ene (common name: methanotetrahydrofluorene) and a derivative thereof. Examples of the monomer having the structure Y as a structural unit may include tetracyclo [4.4.0.1$^{2,5}$.1$^{7,10}$]deca-3,7-diene (common name: tetracyclododecene) and a derivative thereof (a derivative having a substituent on its ring).

The aforementioned monomers may be polymerized by a publicly known method. If necessary, the aforementioned monomers may be copolymerized with an optional monomer and may also be hydrogenated to form a desired polymer. In the case of hydrogenation, the degree of hydrogenation is 90% or more, preferably 95% or more, and more preferably 99% or more from the viewpoint of heat aging resistance and light aging resistance.

Furthermore, if necessary, the obtained polymer may be modified by using, for example, a modifying agent, such as α,β-unsaturated carboxylic acid and a derivative thereof, a styrenic hydrocarbon, an organosilicon compound having an olefinic unsaturated bond and a hydrolyzable group, or an unsaturated epoxy monomer.

The number-average molecular weight (Mn) of the polymer having an alicyclic structure is preferably 10,000 or more, more preferably 15,000 or more, and particularly preferably 20,000 or more, and is preferably 200,000 or less, more preferably 100,000 or less, and particularly preferably 50,000 or less. When the number-average molecular weight is in this range, the substrate film has a good balance of mechanical strength and molding processability.

The number-average molecular weight of the polymer having an alicyclic structure may be measured by GPC (gel permeation chromatography) using a cyclohexane solvent in terms of polyisoprene.

In the thermoplastic resin containing the polymer having an alicyclic structure, the amount of the polymer having an alicyclic structure is preferably 50% by weight to 100% by weight, and more preferably 70% by weight to 100% by weight. By confining the amount of the polymer having an alicyclic structure within the aforementioned range, a substrate film having desired properties can be easily obtained.

If necessary, the thermoplastic resin containing the polymer having an alicyclic structure may contain an optional component in combination with the polymer having an alicyclic structure. Examples of the optional component may include the following compounding agents: an ultraviolet absorber; an inorganic fine particle; a stabilizer, such as an antioxidant, a thermal stabilizer, and a near-infrared absorber; a resin modifier, such as a lubricant and a plasticizer; a colorant, such as a dye and a pigment; and an antiaging agent. As the optional component, one type thereof may be used alone, and two or more types thereof may also be used in combination at any ratio.

The substrate film may be a monolayer film having only one layer or may be a multilayer film having two or more layers. In particular, the substrate film is preferably a multilayer film including a first surface layer, an intermediate layer containing an ultraviolet absorber, and a second surface layer in this order in the thickness direction. More specifically, the substrate film includes a first surface layer made of a thermoplastic resin containing a polymer having an alicyclic structure, an intermediate layer made of a thermoplastic resin containing a polymer having an alicyclic structure and an ultraviolet absorber, and a second surface layer made of a thermoplastic resin containing a polymer having an alicyclic structure in this order in the thickness direction. In this multilayer film, the first surface layer and the second surface layer can prevent the ultraviolet absorber in the intermediate layer from bleedout.

To effectively suppress bleedout, the first surface layer and the second surface layer are preferably free of an ultraviolet absorber. The polymer contained in the first surface layer, the polymer contained in the intermediate layer, and the polymer contained in the second surface layer may be the same as or different from one another. The thermoplastic resin contained in the first surface layer thus may be different from the thermoplastic resin contained in the second surface layer. However, these thermoplastic resins are preferably the same for facilitating formation of the layers. The first surface layer and the second surface layer are usually formed of the same thermoplastic resin as that contained in the intermediate layer except that the thermoplastic resin contained in the first surface layer and the second surface layer is free of an ultraviolet absorber.

Examples of the ultraviolet absorber may include an organic ultraviolet absorber, such as a triazine-based ultraviolet absorber, a benzophenone-based ultraviolet absorber, a benzotriazole-based ultraviolet absorber, and an acrylonitrile-based ultraviolet absorber. In particular, a triazine-based ultraviolet absorber is preferable because it exhibits good ultraviolet-absorbing performance at a wavelength of about 380 nm. The ultraviolet absorber preferably has a molecular weight of 400 or more.

As the triazine-based ultraviolet absorber, for example, a compound having a 1,3,5-triazine ring may be preferably used. Specific examples of the triazine-based ultraviolet absorber may include 2-(4,6-diphenyl-1,3,5-triazin-2-yl)-5-[(hexyl)oxy]-phenol, and 2,4-bis(2-hydroxy-4-butoxyphenyl)-6-(2,4-dibutoxyphenyl)-1,3,5-triazine. Examples of commercially available triazine-based ultraviolet absorbers may include "Tinuvin 1577" (available from Ciba Specialty Chemicals).

Examples of the benzotriazole-based ultraviolet absorber may include 2,2'-methylenebis[4-(1,1,3,3-tetramethylbutyl)-6-(2H-benzotriazol-2-yl)phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-(tert-butyl)phenol, 2-(2H-benzotriazol-2-yl)-4,6-di-tert-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, a reaction product of methyl 3-(3-(2H-benzotriazol-2-yl)-5-tert-butyl-4-hydroxyphenyl)propionate/polyethylene glycol 300, and 2-(2H-benzotriazol-2-yl)-6-(straight-chain and side-chain dodecyl)-4-methylphenol. Examples of commercially available triazole-based ultraviolet absorbers may include "ADK STAB LA-31" (available from Adeka Corporation).

As the ultraviolet absorber, one type thereof may be used alone, and two or more types thereof may also be used in combination at any ratio.

The amount of the ultraviolet absorber in the thermoplastic resin contained in the intermediate layer is preferably 1% by weight or more, and more preferably 3% by weight or more, and is preferably 8% by weight or less, and more preferably 6% by weight or less. The amount of the ultraviolet absorber refers to the total amount of ultraviolet absorbers when two or more ultraviolet absorbers are used. When the amount of the ultraviolet absorber is equal to or more than the lower limit of the aforementioned range, the transmission of ultraviolet rays having a wavelength of 200 nm to 370 nm can be suppressed effectively. When the amount of the ultraviolet absorber is equal to or less than the upper limit, yellowish appearance of the film can be suppressed and color deterioration can thereby be suppressed. By confining the amount of the ultraviolet absorber in the aforementioned range, a decrease in the heat resistance of the thermoplastic resin can be suppressed because of the non-large containing amount of the ultraviolet absorber.

Examples of the method for producing the thermoplastic resin containing a polymer having an alicyclic structure and an ultraviolet absorber may include a method of mixing an ultraviolet absorber with the polymer having an alicyclic structure before producing the substrate film by melt extrusion; a method of using a masterbatch containing an ultraviolet absorber in a high concentration; and a method of mixing an ultraviolet absorber with the polymer having an alicyclic structure during the production of the substrate film by melt extrusion. In these methods, the dispersibility of the ultraviolet absorber can be sufficiently increased by setting the amount of the ultraviolet absorber in the aforementioned range.

The glass transition temperature of the thermoplastic resin is preferably 80° C. or higher, more preferably 100° C. or higher, sill more preferably 120° C. or higher, yet still more preferably 130° C. or higher, yet still more preferably 150° C. or higher, and particularly preferably 160° C. or higher, and is preferably 250° C. or lower, and more preferably 180° C. or lower. When the glass transition temperature of the thermoplastic resin is equal to or higher than the lower limit of the aforementioned range, the substrate film can have high durability in a high-temperature environment. When the glass transition temperature is equal to or lower than the upper limit, the substrate film can be stretched easily.

The photoelastic coefficient of the thermoplastic resin is preferably $10 \times 10^{-10}$ $Pa^{-1}$ or less, more preferably $10 \times 10^{-12}$ $Pa^{-1}$ or less, and particularly preferably $4 \times 10^{-12}$ $Pa^{-1}$ or less. By confining the photoelastic coefficient of the thermoplastic resin within the aforementioned range, a change in the retardation of the substrate film caused by the tensile stress during handling such as film attachment can be suppressed. The lower limit of the photoelastic coefficient of the thermoplastic resins is not limited, although it may be $1 \times 10^{-13}$ $Pa^{-1}$ or higher. The photoelastic coefficient C is a value represented by $C = \Delta n / \sigma$, where $\Delta n$ is birefringence and $\sigma$ is stress.

Furthermore, when the substrate film includes the first surface layer, the intermediate layer, and the second surface layer, the glass transition temperature TgA of the thermoplastic resin contained in the intermediate layer and the glass transition temperature TgB of the thermoplastic resin contained in the first surface layer and the second surface layer preferably satisfy a relationship of TgB−TgA<15° C.

The light transmittance of the substrate film at a wavelength of 380 nm is preferably 10% or less, more preferably 5% or less, and particularly 1% or less. The light transmittance of the substrate film at a wavelength of 280 nm to 370 nm is preferably 1.5% or less, and more preferably 1% or less. This allows the antistatic film to block ultraviolet rays, which results in less damage to the polarizers and the liquid crystal cell due to ultraviolet rays in the liquid crystal display device including the antistatic film. This minimizes a decrease in the polarization degree of the polarizers and coloration of the polarizers and further stabilizes liquid crystal driving in the liquid crystal cell.

The light transmittance may be measured by using a spectrophotometer in accordance with JIS K 0115.

The substrate film may be an optically isotropic film or may be an optically anisotropic film. The substrate film may be, for example, an isotropic film having an in-plane retardation Re of 10 nm or less. When the substrate film is an isotropic film, the retardation Rth of the substrate film in the thickness direction is preferably 10 nm or less. The substrate film may be, for example, a quarter-wave plate having an in-plane retardation Re of 120 nm to 150 nm. When the substrate film is a quarter wavelength plate, the retardation Rth of the substrate film in the thickness direction is preferably 60 nm to 225 nm.

Fluctuation of the in-plane retardation Re of the substrate film is preferably within 10 nm, more preferably within 5 nm, and particularly preferably within 2 nm. Fluctuation of the retardation Rth of the substrate film in the thickness direction is preferably within 20 nm, more preferably within 15 nm, and particularly preferably within 10 nm. By confining the fluctuation of the retardations Re and Rth within the aforementioned range, a liquid crystal display device including the antistatic film of the present invention can exhibit good display quality.

The amount of volatile components in the substrate film is preferably 0.1% by weight or less, more preferably 0.05% by weight or less, and more preferably 0.02% by weight or less. With the reduced amount of volatile components, size stability can be improved and change in optical characteristics such as retardation with the lapse of time can be reduced.

The volatile component refers to a substance having a molecular weight of 200 or less. Examples of volatile components may include residual monomers and solvents. The amount of volatile components may be determined as the total amount of substances having a molecular weight of 200 or less by gas chromatography analysis.

The thickness of the substrate film is preferably 10 μm or more, more preferably 20 μm or more, and particularly preferably 30 μm or more, and is preferably 60 μm or less, and more preferably 50 μm or less. By confining the thickness of the substrate film within the aforementioned range, reduction in thickness of the antistatic film can be achieved. When the substrate film includes the first surface layer, the intermediate layer, and the second surface layer, the thickness of the intermediate layer is preferably 10 μm or more and 40 μm or less, and the total thickness of the first surface layer and the second surface layer is preferably 5 μm or more and 20 μm or less. Furthermore, the ratio of the thickness of the intermediate layer relative to the total thickness of the first surface layer and the second surface layer {(the thickness of the intermediate layer)/(the total thickness of the first surface layer and the second surface layer)} is preferably 1 to 3 from the viewpoint of production stability. In addition, fluctuation of the thickness of the intermediate layer is preferably within ±2.0 μm over the entire surface in order to improve the image display properties of the liquid crystal display device.

The substrate film may be produced by, for example, molding a thermoplastic resin into a form of film. Examples of the molding method to be used may include a heat-melting molding method and a solution casting method. In particular, a heat-melting molding method is preferably used because this method can reduce the amount of volatile components in the film. Specific examples of the heat-melting molding method may include a melt-extrusion molding method, a press molding method, an inflation molding method, an injection molding method, a blow molding method, and a stretch molding method. Among these methods, a melt-extrusion molding method is preferably used to obtain a substrate film having good mechanical strength and high surface accuracy.

In particular, a co-extrusion method is preferably used when the film to be produced as a substrate film is a multilayer film including two or more layers. For example, a substrate film having a multilayer structure including a first surface layer, an intermediate layer, and a second surface layer may be produced by co-extruding a thermoplastic resin for forming the first surface layer, a thermoplastic resin for forming the intermediate layer, and a thermoplastic resin for forming the second surface layer through a die. Among these co-extrusion methods, a T-die co-extrusion method is preferable. Examples of the T-die co-extrusion method may include a feed block system and a multi-manifold system.

In a T-die co-extrusion method, the melting temperature of the thermoplastic resin in an extruder having a T-die is preferably Tg+80° C. or higher, and more preferably Tg+100° C. or higher, and is preferably Tg+180° C. or lower, and more preferably Tg+150° C. or lower. "Tg" denotes the glass transition temperature of the thermoplastic resin. When the substrate film includes a first surface layer, an intermediate layer, and a second surface layer, "Tg" denotes the glass transition temperature of the thermoplastic resin contained in the first surface layer and the second surface layer. When the melting temperature in the extruder is equal to or higher than the lower limit of the aforementioned range, the flowability of the thermoplastic resin can be sufficiently increased. When the melting temperature in the extruder is equal to or lower than the upper limit of the aforementioned range, the thermoplastic resin undergoes less deterioration.

In a melt-extrusion molding method, the temperature of the thermoplastic resin in the extruder is preferably Tg to (Tg+100° C.) at a resin inlet and (Tg+50° C.) to (Tg+170° C.) at an extruder outlet, and the temperature of the die is preferably (Tg+50° C.) to (Tg+170° C.)

The method for producing the substrate film may include a step of stretching a film obtained by the above-described molding method. The stretching process may cause the substrate film to exhibit optical characteristics such as retardation.

The stretching process may be performed by any method according to desired retardation that the substrate film is to exhibit. For example, the stretching process may be a uniaxial stretching process in which the film is stretched only in one direction or may be a biaxial stretching process in which the film is stretched in two different directions. The biaxial stretching process may be a simultaneous biaxial stretching process in which the film is stretched in two directions simultaneously or may be a sequential biaxial stretching process in which the film is stretched in one direction and then stretched in another direction. The stretching process may be any process selected from a lengthwise stretching process in which the film is stretched in the film lengthwise direction, a transverse stretching process in which the film is stretched in the film width direction, and a diagonal stretching process in which the film is stretched in a diagonal direction with respect to the film width direction, which is neither parallel nor perpendicular to the film width direction. The stretching process may be a combination of these stretching processes. Examples of types of stretching processes may include a roll type, a float type, and a tenter type.

When the substrate film is a film that can function as a quarter-wave plate, a diagonal stretching process is preferable among the above-described stretching processes. When an antistatic film including a substrate film that functions as a quarter-wave plate is attached to a polarizer for use, the antistatic film and the polarizer are usually attached to each other such that the transmission axis of the polarizer and the slow axis of the substrate film are neither parallel nor perpendicular to each other but intersect at a specific angle. In this case, the substrate film obtained by a diagonal stretching process has a slow axis exhibited in a diagonal direction with respect to the width direction of the substrate film. This eliminates the need to cut the antistatic film in a sheet form for film attachment and enables efficient film attachment by a roll-to-roll method.

Specific examples of methods for diagonal stretching process may include the methods described in Japanese Patent Application Laid-Open Nos. Sho. 50-83482 A, Hei. 2-113920 A, Hei. 3-182701 A, 2000-9912 A, 2002-86554 A, and 2002-22944 A. Examples of stretching machines that may be used in the diagonal stretching process may include a tenter stretching machine. Examples of the tenter stretching machine may include a transverse uniaxial stretching machine and a simultaneous biaxial stretching machine. In particular, a machine that is capable of performing continuous diagonal stretching of a long-length film is preferable.

The stretching temperature based on the glass transition temperature Tg of the thermoplastic resin contained in the substrate film is preferably Tg−30° C. or higher, and more preferably Tg−10° C. or higher, and is preferably Tg+60° C. or lower, and more preferably Tg+50° C. or lower.

The stretching ratio is preferably 1.01 to 30, preferably 1.01 to 10, and more preferably 1.01 to 5.

The surface of the substrate film may be subjected to a surface treatment if necessary. For example, the surface of the substrate film on which the antistatic layer is to be provided may be subjected to a surface treatment, such as a plasma treatment, a corona treatment, an alkali treatment, or a coating treatment, for increasing the adhesion strength between the substrate film and the antistatic layer.

The corona treatment is preferable among surface treatments. The corona treatment can significantly increase the adhesion strength between the substrate film and the antistatic layer. The irradiation amount of electrons produced by corona discharge during the corona treatment is preferably 1 W/m²/min to 1000 W/m²/min. The corona-treated surface of the substrate film preferably has a water contact angle of 10° to 50°. The water contact angle may be determined in accordance with the θ/2 method in JIS R 3257. After the corona treatment, removal of static electricity from the substrate film may preferably be performed before forming the antistatic layer on the corona-treated surface of the substrate film for improving the appearance of the antistatic layer.

[3. Antistatic Layer]

The antistatic layer is a layer provided on the substrate film and contains electroconductive metal oxide particles. In this case, the antistatic layer may be provided indirectly on the substrate film with an optional layer interposed therebetween but is usually provided directly on the surface of the substrate film. In the antistatic layer, the metal oxide particles agglomerate such that these metal oxide particles are connected to each other in a form of a chain to form chain-connected bodies. These chain-connected bodies form electroconductive paths. Therefore, the antistatic film of the present invention can exhibit an antistatic function.

[3.1. Metal Oxide Particles]

Examples of the metal oxide in the metal oxide particles may include tin oxide; antimony-, fluorine-, or phosphorus-doped tin oxide; indium oxide; antimony-, tin-, or fluorine-doped indium oxide; antimony oxide; and reduced titanium oxide. In particular, antimony-doped tin oxide and antimony-doped indium oxide are preferable. One type thereof may be used alone, and two or more types thereof may also be used in combination at any ratio.

The average particle diameter of the metal oxide particles is preferably 2 nm or more, more preferably 4 nm or more, and particularly preferably 5 nm or more, and is preferably 50 nm or less, more preferably 40 nm or less, and particularly preferably 10 nm or less. When the average particle diameter of the metal oxide particles is equal to or larger than the lower limit of the aforementioned range, tendency of the metal oxide particles to agglomerate in a form of clusters can be reduced, which facilitates connection in a form of a chain of the metal oxide particles during agglomeration of the metal oxide particles. When the average particle diameter of the metal oxide particles is equal to or smaller than the upper limit, haze of the antistatic layer can be reduced and transparency of the antistatic layer can be improved. Furthermore, such an average particle diameter can facilitate connection in a form of a chain of the metal oxide particles.

The average particle diameter of the particles refers to a particle diameter with which the scattering intensity is maximized assuming that the particle diameter distribution measured by laser diffraction analysis is a normal distribution.

The metal oxide particles preferably have a surface treated with a hydrolyzable organosilicon compound. In the metal oxide particles thus treated, the surfaces of the particles formed of a metal oxide themselves are usually modified with a hydrolysis product of the organosilicon compound. Hereinafter, the treatment of the surfaces of the metal oxide particles by using a hydrolyzable organosilicon compound may be referred to as "modification". The metal oxide particles having the surfaces treated with a hydrolyzable organosilicon compound may be referred to as "modified particles". This modification leads to strong chain connection between the metal oxide particles or improves the dispersibility of the metal oxide particles.

Examples of the hydrolyzable organosilicon compound may include organosilicon compounds represented by the formula (1) described below.

$$R^2{}_a Si(OR^2)_{4-a} \quad (1)$$

(in the formula (1), $R^1$ and $R^2$ each independently represent a group selected from the group consisting of a hydrogen atom, a halogen atom, a hydrocarbon group having 1 to 10 carbon atoms, and an organic group having 1 to 10 carbon atoms, and a represents an integer of 0 to 3.)

Examples of suitable $R^1$ in the formula (1) may include a vinyl group, an acryl group, and an alkyl group having 1 to 8 carbon atoms.

Examples of suitable $R^2$ in the formula (1) may include a hydrogen atom, a vinyl group, an aryl group, an acrylic group, an alkyl group having 1 to 8 carbon atoms, and —$CH_2OC_nH_{2n+1}$ (n represents an integer of 1 to 4).

The organosilicon compound represented by the formula (1) is preferably an organosilicon compound where "a" is 0 or 1. Tetrafunctional organosilicon compounds represented by the formula (1) where "a" is 0 are effective for maintaining the connection between the metal oxide particles. Trifunctional organosilicon compounds represented by the formula (1) where "a" is 1 are effective for improving the dispersibility of chain-connected metal oxide particles in an antistatic agent. In addition, trifunctional and higher functional organosilicon compounds represented by the formula (1) where "a" is 0 or 1 usually undergo hydrolysis at high rate.

The organosilicon compound represented by the formula (1) is preferably a combination of a tetrafunctional organosilicon compound where "a" is 0 and a trifunctional organosilicon compound where "a" is 1. When these organosilicon compounds are used in combination, the molar ratio of the tetrafunctional organosilicon compound relative to the trifunctional organosilicon compound (tetrafunctional organosilicon compound/trifunctional organosilicon compound) is preferably 20/80 or higher, and more preferably 30/70 or higher, and is preferably 80/20 or lower, and more preferably 70/30 or lower. Avoidance of an excess amount of the tetrafunctional organosilicon compound can prevent the metal oxide particles from forming agglomerates in the form of clusters, which facilitates generation of chain connection. Avoidance of an excess amount of the trifunctional organosilicon compound can suppress gel formation at the time of forming connection of the metal oxide particles. Therefore, a combination of the tetrafunctional organosilicon compound and the trifunctional organosilicon compound represented by the formula (1) at the aforementioned molar ratio allows the metal oxide particles to be effectively connected to each other in a form of a chain.

As described above, the use of the tetrafunctional organosilicon compound and the trifunctional organosilicon compound in combination as the organosilicon compound represented by the formula (1) allows the metal oxide particles to be strongly connected to each other in a form of a chain. The reason for this is not clear but supposed as described below. Since the connected sites of the metal oxide particles are highly active, the tetrafunctional organosilicon compound where "a" is 0 tends to be adsorbed to the connected sites of the metal oxide particles. The tetrafunctional organosilicon compound, which tends to be hydrolyzed, undergoes hydrolysis as mixed with an alcohol, forming many Si—OH. The trifunctional organosilicon compound where "a" is 1, which has low solubility in water, undergoes hydrolysis as dissolved in water by mixing it with an alcohol. Thus, the trifunctional organosilicon compound is supposed to react with the Si—OH of the tetrafunctional organosilicon compound formed by the hydrolysis of the tetrafunctional organosilicon compound that has been adsorbed to the connected sites of the metal oxide particles.

Therefore, when the tetrafunctional organosilicon compound and the trifunctional organosilicon compound are used in combination, it is preferable that the tetrafunctional organosilicon compound is first mixed with an aqueous dispersion of the metal oxide particles and then mixed with an alcohol and the trifunctional organosilicon compound, rather than mixing these organosilicon compounds simultaneously with an aqueous dispersion of the metal oxide particles.

Specific examples of the hydrolyzable organosilicon compound may include tetraalkoxysilanes, such as tetramethoxysilane and tetraethoxysilane; trialkoxysilanes or triacyloxysilanes such as methyltrimethoxysilane, methyltriethoxysilane, methyltriacetoxysilane, methyltripropoxysilane, ethyltrimethoxysilane, ethyltriethoxysilane, vinyltrimethoxysilane, vinyltriethoxysilane, vinyltriacetoxysilane, phenyltrimethoxysilane, phenyltrimethoxysilane, phenyltriethoxysilane, phenyltriacetoxysilane, γ-chloropropyl trimethoxysilane, γ-chloropropyl triethoxysilane, γ-chloropropyl tripropoxysilane, γ-glycidoxypropyl trimethoxysilane, γ-glycidoxypropyl triethoxysilane, γ-(β-glycidoxyethoxy)propyl trimethoxysilane, γ-methacryloxypropyl trimethoxysilane, γ-aminopropyl trimethoxysilane, γ-mercaptopropyl triethoxysilane; dialkoxysilanes and diacylsilanes, such as dimethyldimethoxysilane, dimethyldiethoxysilane, phenyl methyl diethoxysilane, γ-glycidoxypropyl methyldimethoxysilane, γ-glycidoxypropyl phenyldiethoxysilane, γ-chloropropyl methyldimethoxysilane, dimethyl diacetoxysilane, γ-methacryloxypropyl methyldimethoxysilane, γ-mercaptopropyl methyldimethoxysilane, and γ-aminopropyl methyldimethoxysilane; and trimethylchlorosilane. One type thereof may be used alone, and two or more types thereof may also be used in combination at any ratio.

Subsequently, the method for producing the modified particles (metal oxide particles having the surfaces treated with a hydrolyzable organosilicon compound) will be described. In the production method described below, the modified particles are produced in a form of a dispersion.

In the method for producing the modified particles, an aqueous dispersion of the metal oxide particles to be treated is prepared. At this time, the concentration of the metal oxide particles in the aqueous dispersion is preferably 1% by weight or more, and more preferably 10% by weight or more, and is preferably 40% by weight or less.

Subsequently, the pH of the aqueous dispersion is adjusted to preferably 2 or higher, and more preferably 2.5 or higher, and preferably 5 or lower, and more preferably 4 or lower. When the pH of the aqueous dispersion is equal to or higher than the lower limit of the aforementioned range, spherical agglomerations of the metal oxide particles can be suppressed, which facilitates generation of chain connection. When the pH of the aqueous dispersion is equal to or lower than the upper limit, number of the connected metal oxide particles can be elevated upon connecting the metal oxide particles in a form of a chain. The average number of the connected metal oxide particles can thus be easily elevated to be as large as 2 or more. Consequently, antistatic performance of the antistatic film can be easily improved.

Examples of the pH adjustment method may include an ion exchange treating method using an ion-exchange resin, and a method of adding an acid. The ion-exchange resin is preferably an H-type cation exchange resin. The pH of the aqueous dispersion can be usually shifted to the acidic range by ion exchange treatment. If the pH is not sufficiently reduced only by ion exchange treatment using an ion-exchange resin, an acid may be added to the aqueous dispersion in accordance with the necessity.

Since the ion exchange treatment usually involves deionization treatment, the treatment may enhance tendency of the metal oxide particles to be oriented in a form of a chain.

After pH adjustment, the solid concentration of the aqueous dispersion is preferably adjusted in a suitable range by concentrating or diluting the aqueous dispersion of the metal oxide particles. Specifically, the solid concentration of the aqueous dispersion after pH adjustment is adjusted to preferably 10% by weight or more, and more preferably 15% by weight or more, and is preferably 40% by weight or less, and more preferably 35% by weight or less. When the solid concentration of the aqueous dispersion of the metal oxide particles is equal to or higher than the lower limit of the aforementioned range, tendency of the metal oxide particles to be connected in a form of a chain can be enhanced. The average number of the connected metal oxide particles can thus be easily elevated to be as large as 3 or more. Consequently, antistatic performance of the antistatic film can be easily improved. When the solid concentration is equal to or lower than the upper limit or less, viscosity of the aqueous dispersion of the metal oxide particles can be reduced, whereby mixing by stirring can be sufficiently effected. Consequently, a hydrolyzable organosilicon compound can be uniformly adsorbed to the metal oxide particles.

Subsequently, the aqueous dispersion of the metal oxide particles prepared as described above is mixed with a hydrolyzable organosilicon compound. Examples of the hydrolyzable organosilicon compound may include compounds represented by the formula (1) described above.

The amount of the hydrolyzable organosilicon compound may be appropriately set according to factors, such as the type of organosilicon compound, and the particle diameter of the metal oxide particles. The weight ratio of the hydrolyzable organosilicon compound relative to the metal oxide particles (organosilicon compound/metal oxide particles) is preferably 0.01 or higher, and more preferably 0.02 or higher, and is preferably 0.5 or lower, and more preferably 0.3 or lower. When two or more types of the organosilicon compounds are used, it is preferable that the total amount of the organosilicon compounds satisfies the aforementioned range of the weight ratio. When the weight ratio is equal to or higher than the lower limit of the aforementioned range, the connection between the metal oxide particles connected in a form of a chain can be prevented from breaking in the antistatic agent, which provides an antistatic film having a good antistatic function. Further, dispersibility of the metal oxide particles in the antistatic agent can be improved, viscosity of the antistatic agent can be reduced, and stability with the lapse of time of the antistatic agent can be improved. Consequently, haze of the antistatic layer can be reduced. When the weight ratio is equal to or lower than the upper limit of the aforementioned range, thickness of the layer formed of the hydrolysis product of the organosilicon compound that modifies the surfaces of the metal oxide particles can be confined in a level that is not excessively thick, and thus the surface resistance of the antistatic layer can be reduced.

In the method for producing the modified particles described herein, a step of hydrolyzing the hydrolyzable organosilicon compound is performed by mixing an alcohol and an aqueous dispersion of the metal oxide particles. This step is usually carried out after the step of mixing an aqueous dispersion of metal oxide particles with a hydrolyzable organosilicon compound. However, as described above, when a tetrafunctional organosilicon compound and a trifunctional organosilicon compound are used in combination, preferably, the tetrafunctional organosilicon compound is first mixed with an aqueous dispersion of metal oxide particles, and this aqueous dispersion is then mixed with an alcohol. Furthermore, in this case, the trifunctional organosilicon compound is preferably mixed with the aqueous dispersion of the metal oxide particles simultaneously with or after the mixing of the aqueous dispersion of the metal oxide particles with an alcohol as described above.

Examples of the alcohol may include methyl alcohol, ethyl alcohol, normal propyl alcohol, isopropyl alcohol, and butanol. As the alcohol, one type thereof may be used alone, and two or more types thereof may also be used in combination at any ratio. The alcohol may be combined with an organic solvent, such as ethylene glycol monomethyl ether, ethylene glycol monoethyl ether, ethylene glycol monobutyl ether, propylene glycol monomethyl ether, or propylene glycol monomethyl ether.

The amount of the alcohol is preferably controlled such that the solid concentration of the aqueous dispersion of the metal oxide particles after mixed with the alcohol falls within a desired range. The desired range of the solid concentration of the aqueous dispersion is preferably 3% by weight or higher, and more preferably 5% by weight or higher, and is preferably 30% by weight or lower, and more preferably 25% by weight or lower. The solid concentration of the aqueous dispersion refers to a total solid concentration including an organosilicon compound content, and the organosilicon compound content is based on silica.

The temperature of the hydrolysis is preferably 30° C. or higher, and more preferably 40° C. or higher. The upper limit of the temperature of the hydrolysis is usually equal to or lower than the boiling point (about 100° C.) of the solvent used. When the temperature of the hydrolysis is equal to or higher than the lower limit, a period of time required for the hydrolysis can be shortened, and the amount of the remaining hydrolyzable organosilicon compounds can be reduced. When the temperature of the hydrolysis is equal to or lower than the upper limit, the resulting modified particles are favorably made stable, which suppresses excessive agglomeration of the particles.

If necessary, an acid may be added to the aqueous dispersion of the metal oxide particles as a hydrolysis catalyst. Examples of the acid may include hydrochloric acid, nitric acid, acetic acid, and phosphoric acid. As the acid, one type thereof may be used alone, and two or more types thereof may also be used in combination at any ratio.

A specific example of the suitable operation for hydrolyzing the organosilicon compounds is as described below.

First, a tetrafunctional organosilicon compound represented by the formula (1) where "a" is 0 is mixed with an aqueous dispersion of metal oxide particles, and the aqueous dispersion is mixed with an alcohol to hydrolyze the tetrafunctional organosilicon compound. The aqueous dispersion is then cooled to room temperature and, if necessary, is mixed with the alcohol again. Thereafter, a trifunctional organosilicon compound represented by the formula (1) where "a" is 1 is mixed with the aqueous dispersion and heated to a temperature suitable for the hydrolysis to induce hydrolysis. With this operation, chain connection between the metal oxide particles can be maintained by the hydrolysis product of the tetrafunctional organosilicon compound. Furthermore, the bonding of the hydrolysis product of the trifunctional organosilicon compound to the surfaces of the metal oxide particles is promoted, which can improve the dispersibility of the metal oxide particles.

The hydrolysis of the organosilicon compounds as described above causes the surfaces of the metal oxide particles to be modified by the hydrolysis products of the organosilicon compounds, producing modified particles. The modified particles just after the hydrolysis are in the form of a dispersion in which the modified particles are dispersed in a solvent such as water. The dispersion of the modified particles as it is may be used to prepare an antistatic agent but, if necessary, the dispersion may be subjected to cleaning treatment or deionization treatment. The deionization treatment lowers the ion concentration to provide a dispersion of the modified particles having good stability. The deionization treatment may be carried out by using, for example, an ion-exchange resin, such as a cation-exchange resin, an anion-exchange resin, or an amphoteric ion-exchange resin. The cleaning treatment may be carried out by using, for example, ultrafiltration.

If necessary, the obtained dispersion of the modified particles may be used after subjected to solvent displacement. The solvent displacement improves the dispersibility of the particles in a binder polymer and a polar solvent described below and thus improves the quality of coating with the antistatic agent. As a result, the antistatic layer has a favorable smooth surface, and generation of appearance defects in the antistatic layer such as streaks and unevenness can be suppressed. Furthermore, scratch resistance, transparency, and adhesion of the antistatic layer can be improved, and haze can be reduced. Moreover, the production reliability for the antistatic film can be improved.

If necessary, the obtained dispersion of the modified particles may be used in a mixture with water. Mixing with water usually increases the number of the modified particles connected and improves the electroconductivity of the resulting antistatic layer. Thus, the antistatic film having a surface resistance of about $10^2$ Ω/sq. to $10^{12}$ Ω/sq. can be obtained, and an antistatic film having good antistatic properties can thus be obtained.

The electroconductive metal oxide particles (the metal oxide particles include the modified particles) are usually connected to each other in a form of a chain in a dispersion or antistatic agent containing the metal oxide particles. Since this connection is also maintained in the antistatic layer, the connected metal oxide particles form an electroconductive path in the antistatic layer. It is assumed that thereby the antistatic layer exhibits good antistatic properties. The metal oxide particles do not agglomerate in the form of clusters but agglomerate so as to be connected to each other in a form of a chain. Therefore, the metal oxide particles is not likely to form large agglomerated clusters that can cause scattering of visible light. It is assumed that thereby the haze value of the antistatic layer containing such metal oxide particles can be reduced. However, the present invention is not limited to the above-described assumptions.

The average number of the connected metal oxide particles is preferably 2 or more, more preferably 3 or more, and particularly preferably 5 or more. When the average number of the connected metal oxide particles is equal to or larger than the lower limit, the antistatic performance of the antistatic layer can be improved. The upper limit of the average number of the connected metal oxide particles is preferably 20 or less, and more preferably 10 or less. When the average number of the connected metal oxide particles is equal to or less than the upper limit, production of the metal oxide particles connected in a form of a chain can be easily performed.

The average number of the connected metal oxide particles may be determined by the following method.

The chain-connected bodies of the connected metal oxide particles are photographed with a transmission electron microscope. From the obtained photograph, the number of the connected metal oxide particles in each of 100 pieces of the chain-connected bodies of the connected metal oxide particles is counted. The average number of the connected metal oxide particles in each chain-connected body is calculated and rounded off to the nearest integer, to obtain the average number of the connected metal oxide particles.

The amount of the metal oxide particles in the antistatic layer is preferably 3% by weight or more, more preferably 5% by weight or more, and particularly preferably 10% by weight or more, and is preferably 50% by weight or less, more preferably 30% by weight or less, and particularly preferably 20% by weight or less. When the amount of the metal oxide particles is equal to or more than the lower limit of the aforementioned range, surface resistance of the antistatic layer can be kept at a low level, to thereby improve antistatic performance. When the amount of the metal oxide particles is equal to or less than the upper limit, haze of the antistatic layer can be reduced, and transparency of the antistatic film can be improved.

[3.2. Binder Polymer]

The antistatic layer usually contains a binder polymer in addition to the metal oxide particles. The binder polymer can hold the metal oxide particles in the antistatic layer.

The binder polymer is preferably a polymer obtained by polymerizing a polymerizable monomer including 50% by weight or more of a compound having three or more (meth)acryloyl groups per molecule. The use of such a polymer as a binder polymer can effectively reduce the surface resistance of the antistatic layer.

Examples of the compound having three or more (meth)acryloyl groups per molecule may include pentaerythritol tri(meth)acrylate, pentaerythritol tetra(meth)acrylate, dipentaerythritol tetra(meth)acrylate, dipentaerythritol penta(meth)acrylate, and dipentaerythritol hexa(meth)acrylate.

As the compound having three or more (meth)acryloyl groups per molecule, one type thereof may be used alone, and two or more types thereof may also be used in combination at any ratio. For example, a combination of pentaerythritol tri(meth)acrylate and pentaerythritol tetra(meth)acrylate, and a combination of dipentaerythritol tetra(meth)acrylate and dipentaerythritol penta(meth)acrylate and dipentaerythritol hexa(meth)acrylate may be used as polymerizable monomers for obtaining the binder polymer.

Among the polymerizable monomers described above, a polymerizable monomer including a compound having four (meth)acryloyl groups per molecule, a compound having five (meth)acryloyl groups per molecule, and a compound having six (meth)acryloyl groups per molecule in an amount of 80% by weight or more in total is preferably used.

As a polymerizable monomer for obtaining the binder polymer, an optional monomeric compound may be used in combination with the compounds having three or more (meth)acryloyl groups per molecule as described above. Examples of the optional monomeric compound may include trifunctional (meth)acrylates, such as trimethylolpropane tri(meth)acrylate and pentaerythritol tri(meth)acrylate; polyfunctional unsaturated monomers, such as ethylene glycol diacrylate, ethylene glycol dimethacrylate, diethylene glycol dimethacrylate, allyl methacrylate, diallyl phthalate, trimethylolpropane triacrylate, glycerol diallyl ether, polyethylene glycol dimethacrylate, and polyethylene glycol diacrylate; compounds having an aromatic ring and a (meth) acryloyl group, such as bis-phenoxyethanol fluorene diacrylate, 2-propenoic acid [5,5'-(9-fluoren-9-ylidene)bis(1,1'-biphenyl)-2-(polyoxyethylene)ester], and 2-propenoic acid [5,5'-4-(1,1'-biphenyl)methylenebis(1,1'-biphenyl)-2-(polyoxyethylene)ester]; and acrylic unsaturated monomers of alkyl (meth)acrylates having 1 to 30 carbon atoms, such as methyl (meth)acrylate, ethyl (meth)acrylate, butyl (meth) acrylate, hexyl (meth)acrylate, cyclohexyl (meth) acrylate, 2-ethylhexyl (meth) acrylate, octyl (meth)acrylate, nonyl (meth)acrylate, lauryl (meth)acrylate, and stearyl (meth) acrylate. One type thereof may be used alone, and two or more types thereof may also be used in combination at any ratio.

As the optional monomeric compound, a compound having a carboxyl group and a polymerizable carbon-carbon double bond is preferably used in an amount of 0.01% by weight to 5% by weight relative to the total amount of the polymerizable monomer because the surface resistance of the antistatic layer can be effectively reduced. Examples of the compound having a carboxyl group and a polymerizable carbon-carbon double bond may include acrylic acid; methacrylic acid; crotonic acid; fumaric acid; itaconic acid; muconic acid; half esters obtained from maleic anhydride and monoalcohols; compounds in which part of hydroxyl groups in hydroxyl group-containing acrylates, such as dipentaerythritol pentaacrylate and pentaerythritol triacrylate, are added to the carbon-carbon double bond of acrylic acid; and compounds obtained by the reaction between dicarboxylic acid or carboxylic anhydride and a hydroxyl group in hydroxyl group-containing acrylates, such as dipentaerythritol pentaacrylate and pentaerythritol triacrylate. One type thereof may be used alone, and two or more types thereof may also be used in combination at any ratio.

The acid value of a polymerizable monomer including 50% by weight or more of a compound(s) having three or more (meth)acryloyl groups per molecule is preferably 0.01 mg KOH/g to 0.5 mg KOH/g. When the acid value of the polymerizable monomer for obtaining the binder polymer is equal to or higher than the lower limit of the aforementioned range, the surface resistance of the antistatic layer can be reduced effectively. When the acid value is equal to or lower than the upper limit, the stability of the antistatic agent can be improved.

The acid value of the polymerizable monomer may be determined by using bromothymol blue as an indicator in accordance with JIS K 0070 (Test methods for acid value, saponification value, ester value, iodine value, hydroxyl value, and unsaponifiable matter of chemical products).

The amount of the binder polymer in the antistatic layer is preferably 50% by weight or more, more preferably 60% by weight or more, and particularly preferably 70% by weight or more, and is preferably 100% by weight or less, more preferably 95% by weight or less, and particularly preferably 90% by weight or less. When the amount of the binder polymer is in the aforementioned range, adhesive strength between the antistatic layer and the substrate film can be enhanced, and dispersibility of the metal oxide particles in the antistatic layer can be improved. Further, the thickness of the antistatic layer can be made uniform.

[3.3. Optional Components]

The antistatic layer may contain optional components in addition to the metal oxide particles and the binder polymer unless advantageous effects of the present invention are significantly impaired. As the optional component, one type thereof may be used alone, and two or more types thereof may also be used in combination at any ratio.

[3.4. Method for Producing Antistatic Layer]

The antistatic layer may be formed by applying an antistatic agent containing metal oxide particles onto the above-described substrate film. Since the antistatic agent at the time of application is usually in the form of a fluid, a step for curing the film of the applied antistatic agent is preferably carried out after applying the antistatic agent onto the substrate film. As an example of such a method for producing the antistatic layer, a preferable method for producing an antistatic layer containing, as a binder polymer, a polymer obtained by polymerizing a polymerizable monomer including 50% by weight or more of a compound(s) having three or more (meth)acryloyl groups per molecule will be described below.

In the method for producing an antistatic layer described in this example, an antistatic agent is first prepared. As the antistatic agent, an antistatic agent containing metal oxide particles and a polymerizable monomer for obtaining a binder polymer is used in this example. As a polymerizable monomer, a polymerizable monomer including 50% by weight or more of a compound(s) having three or more (meth)acryloyl groups per molecule is used.

The polymerizable monomer may usually be polymerized by irradiation with active energy rays, such as ultraviolet rays. Thus, the antistatic agent preferably contains a photopolymerization initiator. Examples of the photopolymerization initiator may include benzoin derivatives, benzyl ketals, α-hydroxyacetophenones, α-aminoacetophenones, acylphosphine oxides, and o-acyl oximes. Examples of commercially available photopolymerization initiators may include a combination of benzophenone/amine, a combination of Michler's ketone/benzophenone, and a combination of thioxanthone/amine (trade name: Irgacure, Darocur, etc. available from Ciba-Geigy). As the photopolymerization initiator, one type thereof may be used alone, and two or more types thereof may also be used in combination at any ratio.

The amount of the photopolymerization initiator is preferably 1 part by weight or more, more preferably 2 parts by weight or more, and particularly preferably 3 parts by weight or more, and is preferably 20 parts by weight or less, more preferably 10 parts by weight, and particularly preferably 5 parts by weight or less relative to 100 parts by weight of the polymerizable monomer. When the amount of the photopolymerization initiator is in the aforementioned range, the polymerizable monomer can be polymerized efficiently, and excessive mixing of the photopolymerization initiator is avoided to minimize yellowing of the antistatic layer and changes in the properties of the antistatic layer, which may be caused by the unreacted photopolymerization initiator.

The antistatic agent may contain a solvent. The solvent is preferably capable of dissolving the polymerizable monomer and preferably volatilizes readily. Examples of such a solvent may include water; alcohols, such as methanol, ethanol, propanol, butanol, isopropanol, diacetone alcohol, furfuryl alcohol, tetrahydrofurfuryl alcohol, ethylene glycol, hexylene glycol, and isopropyl glycol; esters, such as methyl acetate and ethyl acetate; ethers, such as diethyl ether, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and tetrahydrofuran; ketones, such as acetone, methyl ethyl ketone, methyl isobutyl ketone, acetylacetone, acetoacetic ester, and cyclohexanone; cellosolves, such as methyl cellosolve, ethyl cellosolve, and butyl cellosolve; aromatic compounds, such as toluene and xylene; and isophorone. As the solvent, one type thereof may be used alone, and two or more types thereof may also be used in combination at any ratio.

Hydrophilic solvents are preferable among the solvents described above. The use of a hydrophilic solvent suppresses whitening of the antistatic agent caused by absorption of moisture in the air at the time of application of the antistatic agent. Specifically, a solvent mixture of ethanol, methanol, and isopropanol (IPA) is preferable.

Among the solvents described above, diacetone alcohol, cyclohexanone, and acetylacetone are preferable because such solvents improve the flatness of the surface of the film of the applied antistatic agent.

To prepare the metal oxide particles in the form of a water-containing dispersion, a water-soluble solvent is preferably used as a solvent for the antistatic agent.

The amount of the solvent is preferably set such that the solid concentration of the antistatic agent falls in a desired range. The solid concentration of the antistatic agent is preferably 10% by weight or more, more preferably 20% by weight or more, and particularly preferably 30% by weight or more, and is preferably 70% by weight or less, and more preferably 55% by weight or less. By confining the solid concentration of the antistatic agent within the aforementioned range, thickness of the antistatic layer can be confined in a suitable range and production of the antistatic layer having sufficient antistatic performance can be facilitated. Furthermore, the solid concentration of the antistatic agent confined in the aforementioned range usually results in a low haze value of the antistatic layer and thus results in high transparency of the antistatic film. In addition, such a solid concentration usually minimizes cracks of the antistatic layer and curling of the substrate film, and further improves the quality of coating with the antistatic agent because of a low viscosity of the antistatic agent. Therefore, the surface of the antistatic layer can have improved flatness and less streak unevenness.

The antistatic agent may contain optional components that the antistatic layer may contain.

The antistatic agent is obtained by mixing components to be contained in the antistatic agent with a suitable mixer. Examples of the mixer may include a homomixer.

After preparing the antistatic agent, the antistatic agent is applied onto the substrate film to form a film of the antistatic agent on the substrate film. If necessary, the solvent is then removed from the film of the antistatic agent by drying. Thereafter, the film of the antistatic agent is cured by polymerizing the polymerizable monomer by irradiation with active energy rays such as ultraviolet rays, to thereby obtain the antistatic layer.

Examples of the application method may include a bar coating method, a slot coating method, a spin coating method, a roll coating method, a curtain coating method, and a screen printing method.

It is preferable that the application of the antistatic agent is performed in an environment having a specific relative humidity. Specifically, the relative humidity at the time of the application is preferably 40% RH or higher, more preferably 45% RH or higher, more preferably 50% RH or higher, and particularly preferably 52% RH or higher, and is preferably 65% RH or lower, and more preferably 60% RH or lower, more preferably 58% RH or lower, and particularly preferably 57% RH or lower. When the relative humidity of the environment at the time of application is equal to or higher than the lower limit of the aforementioned range, the metal oxide particles can be agglomerated so as to sufficiently cause connection in a form of a chain, which can effectively reduce the surface resistance of the antistatic layer. When the relative humidity of the environment at the time of application is equal to or higher than the lower limit of the aforementioned range, it is possible to suppress electrical discharge caused by the charged substrate film and suppress coating unevenness due to electrical charging unevenness. When the relative humidity of the environment at the time of application is equal to or lower than the upper limit of the aforementioned range, it is possible to suppress excessive agglomeration of the metal oxide particles, which can suppress fracture and haze unevenness of the antistatic layer.

The reason why the relative humidity of the environment at the time of application is set to a value equal to or lower than the upper limit of the aforementioned range will be described specifically.

In general, when a coating material containing a solvent is applied onto a substrate to form a coating film, the solvent volatilizes just after application, and the heat is released from the substrate in an amount corresponding to the heat of volatilization of the solvent, which may cause dew condensation on the surface of the coating film. This phenomenon is called "blushing", and the areas where this blushing occurs sometimes appear white.

If the blushing as described above occurs on the film of the antistatic agent formed on the substrate film, the metal oxide particles contained in the film of the antistatic agent may excessively agglomerate in the areas where the blushing occurs. If the metal oxide particles excessively agglomerate, the antistatic layer may fracture or may have haze unevenness.

The aforementioned consequence of the blushing tends to occur on a portion of the film of the antistatic agent in which a large area is exposed to outside air. This is because, if a large area is exposed to outside air, cooling starts early, which easily causes dew condensation.

Near the edges of the film of the antistatic layer, not only the upper surface of the film of the antistatic agent but also the edge surface of the antistatic layer is exposed to the outside air. Near the edges of the film of the antistatic agent, a large area of the film of the antistatic agent is exposed to the outside air, and the film starts to cool early, so that the film is cooled readily and dew condensation occurs easily. Thus, the film of the antistatic layer is affected by blushing near its edges, where fracture and haze unevenness of the antistatic layer particularly easily occur.

When the relative humidity of the environment at the time of application is equal to or lower than the upper limit of the aforementioned range, occurrence of blushing as described above is suppressed. Consequently, fracture and haze unevenness of the antistatic layer can be suppressed easily in the entire antistatic layer including the vicinity of the edges. Setting the relative humidity of the environment at the time of application to a value equal to or less than the upper limit of the aforementioned range is of significance in that such control suppresses agglomeration of electroconductive particles due to blushing and suppresses fracture and haze unevenness of the antistatic layer to obtain a uniform antistatic layer.

After applying the antistatic agent onto the substrate film as described above, the solvent is removed from the film of the antistatic agent by drying if necessary. The temperature and pressure during drying may appropriately be set according to conditions, such as the type of material for the antistatic layer, the type of solvent, and the thickness of the antistatic layer.

Thereafter, the film of the antistatic agent is irradiated with active energy rays. This irradiation causes polymerization of the polymerizable monomer to cure the film of the antistatic agent, whereby an antistatic layer containing the metal oxide particles and the binder polymer can be obtained. The irradiation conditions, such as the wavelength of the active energy rays and the irradiation amount, may appropriately be set according to conditions, such as the type of material for the antistatic layer and the thickness of the antistatic layer.

[3.5. Structure and Size of Antistatic Layer]

Figure 2:
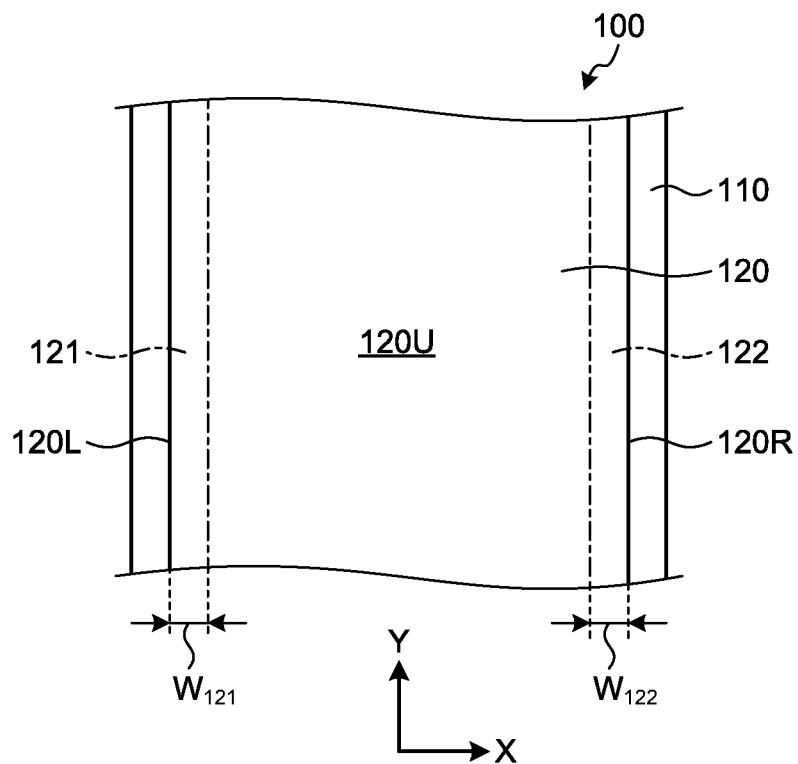
FIG. 2 is a plan view schematically illustrating an example of an antistatic film according to the present invention.

FIG. 2 is a plan view schematically showing an example of an antistatic film according to the present invention.

As described above, the effect of excessive agglomeration of the metal oxide particles due to blushing can be suppressed in the antistatic layer 120 of the antistatic film 100 according to the present invention even when the antistatic layer 120 is formed by applying the antistatic agent onto the substrate film 110. In the antistatic layer 120, the number of fractures can thus be reduced in regions 121 and 122 near both edges of the antistatic layer 120 in the application width direction X.

The application width direction X of the antistatic layer 120 refers to a direction that is an in-plane direction of the antistatic layer 120 and is perpendicular to the application direction Y in the step of applying the antistatic agent in order to form the antistatic layer 120. When the substrate film 110 is a long-length film, the application width direction X usually refers to a direction parallel to the width direction of the substrate film 110.

The regions 121 and 122 near both edges of the antistatic layer 120 in the application width direction X refer to both regions within 50 mm from edges 120L and 120R of the antistatic layer 120 in the application width direction X. In other words, the regions 121 and 122 refer to regions respectively having a width $W_{121}$ of 50 mm and a $W_{122}$ of 50 mm and continuous with the edges 120L and 120R of the antistatic layer 120 in the application width direction X.

As described above, blushing at the time of application of the antistatic agent generally tends to occur near the edges of the film of the antistatic agent. The areas near the edges of the film of the antistatic agent correspond to the regions 121 and 122 near both edges of the antistatic layer 120 in the application width direction X. Therefore fracture of the antistatic layer 120 tend to occur in these regions 121 and 122. However, as described above, appropriate control of the relative humidity of the environment in which the antistatic agent is applied can reduce the number of fractures in the regions 121 and 122 in which fracture tends to occur.

Specifically, the number of fractures each of which having an area of 5 $mm^2$ or larger of the antistatic layer 120 in the regions 121 and 122 each of which is within 50 mm from the edges of the antistatic layer 120 in the application width direction X is preferably less than 10, more preferably 5 or less, and particularly preferably 2 or less per both regions 121 and 122 each having 1 meter length. This can reduce the haze value of the entire antistatic film and thus can increase the transparency of the antistatic film. Furthermore, the surface resistance of the antistatic layer can be confined within a specific range in the entire antistatic film.

The number of fractures of the antistatic layer 120 may be determined by the following method.

The regions 121 and 122 within 50 mm from the edges of the antistatic layer 120 in the application width direction X are microscopically observed. The area of each fracture is determined in the microscope field of view. At this time, a fracture having an area of 5 $mm^2$ or larger is counted as one fracture. This procedure is performed in a range of 1 m in length of the regions 121 and 122 in the application direction Y to determine the number of fractures per both the regions 121 and 122 each having 1 meter length.

The antistatic layer may have a multilayer structure including two or more layers but preferably has a monolayer structure composed of only one layer. When the antistatic layer has a monolayer structure, the antistatic layer can be easily produced, and the antistatic film can be made thin.

The thickness of the antistatic layer is preferably 1.5 μm or more, more preferably 2 μm or more, still more preferably 3 μm or more, and particularly preferably 4 μm or more, and is preferably 10.0 μm or less, more preferably 8 pat or less, still more preferably 7 μm or less, and particularly preferably 6 μm or less. By confining the thickness of the antistatic layer within the aforementioned range, curling of the antistatic film can be suppressed and surface resistance of the antistatic layer can be reduced. In addition, scratch resistance of the antistatic layer can usually be improved.

The thickness of the antistatic layer may be measured with an interference-type film thickness meter ("F20 film thickness measurement system" available from Filmetrics Japan).

The ratio of the thicknesses of the antistatic layer relative to the thickness of the substrate film (antistatic layer/substrate film) is preferably 1/50 or higher, more preferably 1/25 or higher, and particularly preferably 1/12 or higher, and is preferably 3/10 or lower, more preferably 1/5 or lower, and particularly preferably 3/25 or lower. By confining the ratio of the thicknesses of the antistatic layer relative to the thickness of the substrate film within the aforementioned range, curling of the antistatic film can be stably suppressed.

[3.6. Properties of Antistatic Layer]

The surface resistance of the antistatic layer is usually $1.0 \times 10^6$ Ω/sq. or more, preferably $1.0 \times 10^7$ Ω/sq. or more, and more preferably $1.0 \times 10^8$ Ω/sq. or more, and is usually $1.0 \times 10^{10}$ Ω/sq. or less, preferably $5.0 \times 10^9$ Ω/sq. or less, and more preferably $1.0 \times 10^9$ Ω/sq. or less. When the antistatic layer has such a surface resistance, the antistatic properties of the antistatic film can be improved. This can suppress occurrence of unevenness in liquid crystal driving due to electrical charging during operation of an in-cell type touch panel when the antistatic film is incorporated in a liquid crystal display device including the in-cell type touch panel.

The surface resistance may be measured by using a digital super megohmmeter ("DSM-8104" available from HIOKI E.E. CORPORATION) in accordance with JIS K 6911.

The refractive index of the antistatic layer is preferably 1.500 or higher, more preferably 1.510 or higher, still more preferably 1.515 or higher, and particularly preferably 1.520 or higher, and is preferably 1.550 or lower, more preferably 1.540 or lower, still more preferably 1.535 or lower, and particularly preferably 1.530 or lower. By confining the refractive index of the antistatic layer within the aforementioned range, refractive index of the antistatic layer can be confined within the same range as that of the refractive index of the substrate film. Consequently, coating unevenness and uneven spots on the antistatic layer can be made less visually recognizable, and improvement of the appearance of the antistatic film can thereby be facilitated.

The refractive index of the antistatic layer refers to a numerical value at a wavelength of 550 nm obtained by performing Cauchy fitting on the basis of the values measured at three wavelengths of 407 nm, 532 nm, and 633 nm using a refractive index film thickness measuring device ("Prism Coupler" available from Metricon Corporation).

The water contact angle of the surface of the antistatic layer is preferably 70° to 90°. When the water contact angle of the surface of the antistatic layer is in this range, repellency of the adhesive agent can be suppressed at a time when the antistatic film is bonded via an adhesive agent. For example, when a gap between a touch panel and a polarizing plate including the antistatic film is filled with an interlayer adhesive agent during the production of a liquid crystal display device, repellency between the interlayer adhesive agent and the polarizing plate can be suppressed. The water contact angle may be measured by the θ/2 method in accordance with JIS R 3257.

The JIS pencil hardness of the antistatic layer is preferably B or higher, more preferably HB or higher, and particularly preferably H or higher. When the antistatic layer has a high JIS pencil hardness, the antistatic layer can function as a hard coat layer, and scratch resistance of the antistatic film can thus be improved. The JIS pencil hardness is determined by scratching the surface of the layer with pencils in accordance with JIS K5600-5-4. Scratching is performed with pencils with a variety of hardness which are inclined at the angle of 45° to which 500 gram force of downward load is applied. The hardness is determined as the hardness of the pencil that begins to create scratches.

The scratch resistance of the antistatic layer may be evaluated by the following method. The surface of the antistatic layer of the antistatic film is rubbed back and forth with steel wool #0000 for 10 cycles. The back-and-forth rubbing with the steel wool is performed while a load of 10 gf, 50 gf, 100 gf, or 500 gf is applied per square centimeter of steel wool. The surface state after the back-and-forth rubbing is visually observed to determine a load under which no scratches are found.

The load under which no scratches are found is preferably 10 gf or more, more preferably 50 gf or more, and particularly preferably 100 gf or more. By increasing the scratch resistance of the antistatic layer, unintended occurrence of scratches made by external factors in a process for, for example, producing a polarizing plate can be suppressed.

[4. Optional Layers]

The antistatic film of the present invention may include optional layers in combination with the substrate film and the antistatic layer.

For example, the antistatic film may include an antireflective layer on the antistatic layer.

The antistatic film may include an adhesion facilitating layer on the surface of the substrate film opposite to the antistatic layer.

[5. Properties and Shape of Antistatic Film]

The antistatic film of the present invention has an antistatic layer having a surface resistance in a specific range and has a low haze value. The antistatic film of the present invention thus exhibits good performance in terms of both antistatic properties and transparency.

Specifically, the haze value of the antistatic film is usually 0.3% or less, preferably 0.2% or less, more preferably 0.1% or less, and particularly preferably 0.05% or less. When the antistatic film has a haze value in this range, a liquid crystal display device including the antistatic film is unlikely to exhibit poor image visibility due to haze and can display clear images.

The haze value of the antistatic film may be measured by using a haze meter ("Haze Guard II" available from Toyo Seiki Seisaku-sho, Ltd.) in accordance with JIS K 7136.

The transmission hue L* of the antistatic film of the present invention is preferably 94 or higher, more preferably 94.5 or higher, still more preferably 94.7 or higher, and particularly preferably 95.0 or higher, and is preferably 97 or lower, more preferably 96.5 or lower, still more preferably 96.3 or lower, and particularly preferably 96.0 or lower. By confining the transmission hue L* of the antistatic film within the aforementioned range, a liquid crystal display device having the antistatic film can exhibit good image visibility.

The transmission hue L* is a coordinate L* in the L*a*b* color space. The transmission hue L* of the antistatic film may be measured with a spectrophotometer ("V-7200" available from JASCO Corporation) using a C light source.

The total light transmittance of the antistatic film of the present invention is preferably 85% or higher, more preferably 86% or higher, and particularly preferably 88% or higher.

The total light transmittance of the antistatic film may be measured in the wavelength range of 380 nm to 780 nm by using an ultraviolet-visible spectrometer.

The antistatic film of the present invention may be a long-length film or a sheet piece film. The antistatic film is usually produced as a long-length film from the viewpoint of high production efficiency. When the film to be produced is a sheet piece antistatic film, such a sheet piece antistatic film is usually produced by cutting the film having a desired shape out of a long-length antistatic film.

[6. Liquid Crystal Display Device]

The antistatic film of the present invention is preferably provided in a liquid crystal display device. The liquid crystal display device having the antistatic film of the present invention usually includes a liquid crystal cell, a polarizer provided on the viewing side of the liquid crystal cell, and an antistatic film provided on the viewing side of the polarizer. It is preferable that the antistatic film is provided such that the substrate film and the antistatic layer are placed in this order from the proximity of the polarizer. A suitable example of the liquid crystal display device is a liquid crystal display device including a liquid crystal cell, an optional polarizing-plate protective film, a polarizer, and an antistatic film in this order from the liquid crystal cell side toward the viewing side (the side on which the user views images).

Since the antistatic film of the present invention has high transparency and good antistatic properties, drive control of liquid crystal molecules in the liquid crystal cell can be stabilized in the liquid crystal display device while images displayed on the liquid crystal display device are maintained clear. Since the substrate film of the antistatic film is made of a thermoplastic resin containing a polymer including an alicyclic structure, the liquid crystal display device described above has better heat resistance and better moisture resistance than liquid crystal display devices known in the art including a polarizing-plate protective film made of a material such as triacetyl cellulose. In addition, such an antistatic film does not need an aqueous adhesive agent for film attachment, which can suppress quality degradation in the durability test at high temperature and high humidity. When the substrate film of the antistatic film contains an ultraviolet absorber, components such as the liquid crystal cell and the polarizer can be protected from ultraviolet rays to which the components are exposed during the production of the liquid crystal display device and from ultraviolet rays in light coming from the outside to which the components are exposed during the use of the liquid crystal display device.

The liquid crystal cell to be used may be of any type such as a TN liquid crystal cell, a VA liquid crystal cell, and an IPS liquid crystal cell. Among these liquid crystal cells, an IPS liquid crystal cell is preferable because the display color of the liquid crystal display device does not change with changing viewing angle. In a case where the liquid crystal display device is used as a touch panel sensor, in-cell type liquid crystal cells may be used in order to reduce the total thickness of the liquid crystal display device.

The polarizer to be used may be of any type. The polarizer is usually obtained by doping a polyvinyl alcohol-based film with iodine and then stretching the film.

The antistatic film is usually provided such that the substrate film is closer to the liquid crystal cell than the antistatic layer is. In particular, when the substrate film of the antistatic film is a quarter-wave plate, the slow axis of the substrate film of the antistatic film and the transmission axis of the polarizer preferably form a specific angle θ. Specifically, the angle θ is preferably 40° or more, and more preferably 43° or more, and is preferably 50° or less, more preferably 48° or less, and particularly preferably in the range of 45°±1°. This configuration allows polarized light that passes through the liquid crystal cell and the polarizer and that travels through the antistatic film to be converted into circularly polarized light or elliptically polarized light. Consequently, the user of the liquid crystal display device can view displayed contents even while the user wears polarized sunglasses.

As an optional polarizing-plate protective film, an isotropic film that is optically isotropic may be used, and a phase difference film having a desired retardation may also be used. When a phase difference film is used as a polarizing-plate protective film, the phase difference film exhibits an optical compensation function, whereby viewing angle dependence can be improved, and light leakage phenomenon of the polarizer in oblique viewing can be compensated to improve the viewing angle characteristics of the liquid crystal display device. Examples of the phase difference film that may be used may include a film stretched uniaxially in the lengthwise direction, a film stretched uniaxially in the transverse direction, a film stretched biaxially in the lengthwise and transverse directions, and a phase difference film obtained by polymerizing a liquid crystal compound. Specific examples of the phase difference film may include a film obtained by uniaxially or biaxially stretching a thermoplastic resin film made of a thermoplastic resin such as a cycloolefin resin. Examples of commercially available thermoplastic resin films may include "ZEONOR Film" available from ZEON Corporation; "Escena" and "SCA40" available from Sekisui Chemical Co., Ltd.; and "ARTON film" available from JSR Corporation.

The components of the liquid crystal display device, such as the liquid crystal cell, the polarizing-plate protective film, the polarizer, and the antistatic film, may be attached to each other to form integration. For example, the polarizing-plate protective film, the polarizer, and the antistatic film may be attached to each other to form a single polarizing plate. This polarizing plate may be attached to the liquid crystal cell such that the polarizing plate is fixed to the liquid crystal cell. In this case, these components may also be attached to each other with a suitable adhesive agent layer and may also be directly attached to each other by, for example, performing a plasma treatment on the surfaces of the components.

The adhesive agent to be used may be of any type. Examples of the adhesive agent that may be used may include a rubber-based adhesive agent, a fluorine-based adhesive agent, an acrylic-based adhesive agent, a polyvinyl alcohol-based adhesive agent, a polyurethane-based adhesive agent, a silicone-based adhesive agent, a polyester-based adhesive agent, a polyamide-based adhesive agent, a polyether-based adhesive agent, and an epoxy-based adhesive agent. As the adhesive agent, one type thereof may be used alone, and two or more types thereof may also be used in combination at any ratio. In particular, an ultraviolet-curable adhesive agent layer, such as an acrylic-based adhesive agent layer, is preferably provided between the polarizer and the antistatic film, such that the polarizer and the antistatic film are attached to each other with the ultraviolet-curable adhesive agent layer. This can reduce the effect of moisture on the polarizer and thus can suppress the deterioration of the polarizer. At this time, the thickness of the adhesive agent layer is preferably 0.1 μm or more and 2.0 μm or less.

EXAMPLES

The present invention will be described below in detail by way of Examples. It should be noted that the present invention is not limited to Examples described below and may be freely modified and practiced without departing from the scope of claims of the present invention and the scope of their equivalents. In the following description, "%" and "part" expressing the quantity are on the basis of weight unless otherwise specified. The operations described below were carried out at normal temperature and normal pressure unless otherwise specified.

[Evaluation Method]

(Method for Measuring Average Number of Connected Metal Oxide Particles)

Chain-connected bodies of metal oxide particles were photographed with a transmission electron microscope. From the obtained photograph, the number of the connected metal oxide particles for each of 100 pieces of the chain-connected bodies of the connected metal oxide particles was counted. The average number of the connected metal oxide particles was calculated and rounded off to the nearest integer, to obtain the average number of the connected metal oxide particles.

(Method for Measuring Thickness of Substrate Film)

The thickness of the substrate film was measured with a contact-type film thickness meter ("Dial Indicator" available from Mitutoyo Corporation).

(Method for Measuring Light Transmittance of Substrate Film at Measurement Wavelength of 380 nm)

The light transmittance of the substrate film at a measurement wavelength of 380 nm was measured with a spectrophotometer ("V-7200" available from JASCO Corporation).

(Method for Measuring Surface Resistance of Antistatic Layer)

The antistatic film was cut out to obtain a sample film in a form of a 10 cm×10 cm square. The surface resistance of the surface of the sample film on the antistatic layer side was measured by using a digital super megohmmeter ("DSM-8104" available from HIOKI E.E. CORPORATION) in accordance with JIS K 6911.

(Method for Measuring Haze Value of Antistatic Film)

The haze value of the antistatic film was measured by using a haze meter ("Haze Guard II" available from Toyo Seiki Seisaku-sho, Ltd.) in accordance with JIS K 7136.

(Method for Measuring Thickness of Antistatic Layer)

The thickness of the antistatic layer was measured with an interference-type film thickness meter ("F20 film thickness measurement system" available from Filmetrics Japan).

(Method for Measuring Transmission Hue L* of Antistatic Film)

The transmission hue L* of the antistatic film was measured with a spectrophotometer ("V-7200" available from JASCO Corporation) using a C light source.

(Method for Measuring Refractive Index of Antistatic Layer)

The refractive index of the antistatic layer at a wavelength of 550 nm was obtained by performing Cauchy fitting on the basis of the values measured at three wavelengths of 407 nm, 532 nm, and 633 nm using a refractive index film thickness measuring device ("Prism Coupler" available from Metricon Corporation).

(Method for Measuring Number of Fractures of Antistatic Layer)

The regions within 50 mm from the edges of the antistatic layer of the antistatic film in the application width direction were microscopically observed. The area of each fracture was determined in the microscope field of view. At this time, a fracture having an area of 5 mm$^2$ or larger was counted as one fracture. This operation was performed in a range of 1 m in length of the above-described regions in the application direction to measure the number of fractures per both the regions each having 1 meter length.

(Method for Evaluating Visibility of Image on Liquid Crystal Display Device)

The display surface of the liquid crystal display device was viewed through polarized sunglasses. At this time, the case where an image was visible without image blurring was rated "3", which means that the visibility of the image was very good. The case where slight blurring was observed was rated "2", which means that the visibility of the image was good. The case where blurring or display unevenness was observed was rated "1", which means that the visibility of the image was poor.

(Method for Evaluating Stability of Liquid Crystal Driving in Liquid Crystal Display Device)

The touch panel of the liquid crystal display device was operated. The case where an image was visible with no disturbance of liquid crystal driving at this time was rated "3", which means that the stability of liquid crystal driving was very good. The case where liquid crystal driving was rarely disturbed was rated "2", which means that the stability of liquid crystal driving was good. The case where image distortion and display unevenness were observed was rated "1", which means that the stability of liquid crystal driving was poor.

Production Example 1

Production of Metal Oxide Particles

A mixed solution was prepared by dissolving 130 g of potassium stannate and 30 g of antimony potassium tartrate in 400 g of pure water.

An aqueous solution was prepared by dissolving 1.0 g of ammonium nitrate and 12 g of 15% ammonia water in 1000 g of pure water. While this aqueous solution was stirred at 60° C., the mixed solution was added to this aqueous solution over 12 hours to induce hydrolysis. Further, a 10% nitric acid solution was concurrently added to the aqueous solution so as to maintain the aqueous solution at pH 9.0. The hydrolysis generated a precipitate in the aqueous solution.

The formed precipitate was separated by filtration and washed. The precipitate was redispersed in water to prepare a dispersion containing 20% by weight (in terms of the solid concentration) of a hydroxide of a Sb-doped tin oxide precursor. This dispersion was spray-dried at a temperature of 100° C. to obtain powders. The obtained powders were heated at 550° C. for 2 hours in an air atmosphere to obtain an antimony-doped tin oxide powders.

60 parts of the powders were dispersed in 140 parts of a 4.3% by weight aqueous solution of potassium hydroxide to obtain an aqueous dispersion. While this aqueous dispersion was maintained at 30° C., the aqueous dispersion was subjected to grinding in a sand mill for 3 hours to prepare a sol. Subsequently, this sol was subjected to dealkalization by using an ion exchange resin until the pH reached 3.0. Subsequently, pure water was added to this sol to prepare a particle dispersion containing 20% by weight (in terms of the solid concentration) of antimony-doped tin oxide particles. The pH of the particle dispersion was 3.3. The average particle diameter of the particles was 9 nm.

Subsequently, 100 g of the particle dispersion was controlled at 25° C. and 4.0 g of tetraethoxysilane (ethyl orthosilicate available from Tama Chemicals Co., Ltd., $SiO_2$ concentration 28.8%) was added over 3 minutes, followed by stirring for 30 minutes. Thereafter, 100 g of ethanol was added thereto over 1 minute. The mixture was heated to 50° C. in 30 minutes and subjected to a heat treatment for 15 hours. The solid concentration of the dispersion after the heat treatment was 10%.

Subsequently, water and ethanol, which were dispersion media, were replaced with ethanol by using an ultrafiltration membrane. This process yielded a dispersion containing, as metal oxide particles (P1), 20% in terms of the solid concentration of antimony-doped tin oxide particles coated with silica. The metal oxide particles (P1) were connected to each other in a form of a chain as a result of agglomeration of a plurality of metal oxide particles. In this case, the average number of the connected metal oxide particles (P1) was 5.

Example 1

(1-1. Production of Antistatic Agent)

An ultraviolet-curable polymerizable monomer composition (R1) including dipentaerythritol hexaacrylate (hereinafter may be abbreviated as "DP6A"), dipentaerythritol pentaacrylate (hereinafter may be abbreviated as "DP5A"), and dipentaerythritol tetraacrylate (hereinafter may be abbreviated as "DP4A") was prepared. In this polymerizable monomer composition (R1), the weight ratio of the components was DP6A/DP5A/DP4A=64/17/19. The solid concentration of the polymerizable monomer composition (R1) was 100%.

A polyfunctional urethane acrylate (U1) was prepared by causing the urethane reaction between 222 parts by weight of isophorone diisocyanate and 795 parts by weight of a mixture of pentaerythritol triacrylate (hereinafter may be abbreviated as "PE3A") and pentaerythritol tetraacrylate (hereinafter may be abbreviated as "PE4A"). The weight ratio of PE3A/PE4A in the mixture was 75/25. The solid concentration of the polyfunctional urethane acrylate (U1) was 100%.

An ethanol mixture that was a mixture of ethanol, normal propyl alcohol, methanol, and water was prepared. In this ethanol mixture, the weight ratio of the components was (ethanol)/(normal propyl alcohol)/(methanol)/(water)=85.5/9.6/4.9/0.2.

A mixture was prepared by thoroughly mixing well 29.4 parts by weight of the polymerizable monomer composition (R1), 12.6 parts by weight of the polyfunctional urethane acrylate (U1), 7.3 parts by weight of methyl ethyl ketone, 7.3 parts by weight of the ethanol mixture, 7.3 parts by weight of acetylacetone, and 0.86 parts by weight of a photopolymerization initiator ("Irgacure 184" available from BASF Japan Ltd., solid concentration 100%). To this mixture, 35.0 parts by weight of a dispersion of the metal oxide particles (P1) (solid concentration 20%) produced in Production Example 1 and 0.24 parts by weight of an acrylic-based surfactant (solid concentration 100%) were added and uniformly mixed to obtain an active energy ray-curable liquid composition as an antistatic agent (A1).

(1-2. Production of Substrate Film)

A mixture was prepared by mixing 100 parts of a dry thermoplastic resin (COP1) (available form ZEON Corporation, glass transition temperature 123° C.) containing a polymer having an alicyclic structure and 5.5 parts of a benzotriazole-based ultraviolet absorber ("LA-31" available from ADEKA Corporation) with a twin-screw extruder. Subsequently, the resulting mixture was added to a hopper connected to the extruder, fed into a single-screw extruder, and melt-extruded to obtain a thermoplastic resin (J1) containing an ultraviolet absorber. The amount of the ultraviolet absorber in the thermoplastic resin (J1) was 5.2% by weight.

A double flight single-screw extruder having a screw diameter of 50 mm (the ratio of screw effective length L relative to screw diameter D L/D=32) and equipped with a leaf disc polymer filter having a mesh size of 3 μm was provided. To a hopper connected to this single-screw extruder, the thermoplastic resin (J1) was added. The thermoplastic resin (J1) was then melted, and the melted thermoplastic resin (J1) was fed into a multi-manifold die at an extruder outlet temperature of 280° C. and at a rotation speed of the extruder gear pump of 10 rpm. The arithmetic surface roughness Ra of the dies lip of the multi-manifold die was 0.1 μm.

A single-screw extruder (L/D=32) having a screw diameter of 50 mm and equipped with a leaf disc polymer filter having a mesh size of 3 μm was provided separately from the single-screw extruder to which the thermoplastic resin (J1) had been added. To a hopper connected to this single-screw extruder, the thermoplastic resin (COP1) containing a polymer having an alicyclic structure, which was the same as that used to produce the thermoplastic resin (J1), was added. The thermoplastic resin (COP1) was then melted, and the melted thermoplastic resin (COP1) was fed into the multi-manifold die at an extruder outlet temperature of 285° C. and at a rotation speed of the extruder gear pump of 4 rpm.

The melted thermoplastic resin (COP1), the melted thermoplastic resin (J1) containing an ultraviolet absorber, and the melted thermoplastic resin (COP1) were discharged through the multi-manifold die at 280° C. and cast on a cooling roll controlled at a temperature of 150° C. to obtain a prestretched film. The air gap amount when the resins were discharged was set to 50 mm. As the method for casting the discharged resins onto the cooling roll, edge pinning was employed.

The obtained prestretched film was a multi-layer film that had a three-layer structure and that included, in this order, a resin layer having a thickness of 15 μm made of the thermoplastic resin (COP1), a resin layer having a thickness of 40 μm made of the thermoplastic resin (J1) containing an ultraviolet absorber, and a resin layer having a thickness of 15 μm made of the thermoplastic resin (COP1). The prestretched film had a width of 1400 mm and a total thickness of 70 μm. The prestretched film thus obtained was subjected to trimming for removing both edges each having 50 mm width in width direction of the prestretched film, to truncate the width to 1300 mm.

The prestretched film was stretched in a diagonal direction, which was neither parallel nor perpendicular, with respect to the lengthwise direction of the prestretched film, under the conditions of a stretching temperature of 140° C. and a stretching speed of 20 m/min, to thereby obtain a stretched film as a substrate film. The obtained stretched film was a multi-layer film that had a three-layer structure and that included, in this order, a first surface layer having a thickness of 8 μm made of the thermoplastic resin (COP1), an intermediate layer having a thickness of 31 μm made of the thermoplastic resin (J1) containing an ultraviolet absorber, and a second surface layer having a thickness of 8 μm made of the thermoplastic resin (COP1). The stretched film had a width of 1330 mm and a thickness of 47 The slow axis and the lengthwise direction of the stretched film formed an angle of 45°.

The stretched film had an in-plane retardation of 100 nm at a measurement wavelength of 550 nm and had a light transmittance of 0.02% at a measurement wavelength of 380 nm.

(1-3. Production of Antistatic Film)

One surface of the stretched film, which served as a substrate film, was subjected to a corona treatment (output 0.4 kW, corona dosage 200 W·min/m$^2$), and the antistatic agent (A1) was applied onto the stretched film by using a die coater such that the thickness of the antistatic layer obtained after curing was 4.5 μm, to thereby form a film of the antistatic agent (A1). The application of the antistatic agent (A1) was carried out in an environment having a relative humidity of 50%. Subsequently, the film of the antistatic agent (A1) was dried at 60° C. for 2 minutes and then cured by irradiation with light of 250 mJ/cm$^2$ from a high-pressure mercury lamp to form an antistatic layer. This process provided an antistatic film including the substrate film and the antistatic layer provided on the substrate film.

The antistatic film thus obtained was evaluated by the method described above.

(1-4. Production of Liquid Crystal Display Device)

A polarizer produced by doping a resin film with iodine and stretching the resin film in one direction was prepared. One surface of the polarizer was attached to the substrate film side surface of the antistatic film by using an ultraviolet-curable acrylic adhesive agent. In this procedure, the slow axis of the substrate film of the antistatic film was adjusted such that the axis forms an angle of 45° with the transmission axis of the polarizer.

The other surface of the polarizer was attached to a cycloolefin film that had been subjected to transverse uniaxial stretching, which served as a polarizing-plate protective film, by using an ultraviolet-curable acrylic adhesive agent. In this case, the slow axis of the cycloolefin film was adjusted to be parallel to the transmission axis of the polarizer.

Subsequently, the adhesive agent was cured by irradiation with ultraviolet rays, to thereby obtain a polarizing plate including a polarizing-plate protective film, an adhesive agent layer, a polarizer, an adhesive agent layer, a substrate film, and an antistatic layer in this order in the thickness direction.

The polarizing plate was incorporated into a liquid crystal panel including a publicly known in-cell type touch sensor to produce a liquid crystal display device. At this time, the polarizing plate was disposed such that the surface thereof on the antistatic layer side faced the viewing side.

The visibility of an image on the produced liquid crystal display device was evaluated by the method described above. As a result of evaluation, the image was visible without image blurring when the display surface of the liquid crystal display device was viewed through polarizing sunglasses. Therefore, the visibility was rated "3".

The stability of liquid crystal driving in the produced liquid crystal display device was evaluated by the method described above. As a result of evaluation, the image was visible with no disturbance of liquid crystal driving while the user operated the touch panel of the liquid crystal display device. Therefore, the stability of liquid crystal driving was rated "3".

Example 2

In the step (1-3) described above, the thickness of the antistatic layer was changed to 1.2 μm by adjusting the application thickness of the antistatic agent (A1). In the same manner as in Example 1 except for the above-described matter, the production and evaluation of an antistatic film, and the production and evaluation of a liquid crystal display device were carried out.

In Example 2, slight unevenness in liquid crystal driving due to electrical charging was found in the evaluation of the stability of liquid crystal driving of the liquid crystal display device, but such unevenness was acceptable for practical use.

Example 3

In the step (1-3) described above, the thickness of the antistatic layer was changed to 11.0 μm by adjusting the application thickness of the antistatic agent (A1). In the same manner as in Example 1 except for the above-described matter, the production and evaluation of an antistatic film, and the production and evaluation of a liquid crystal display device were carried out.

The visibility of an image on the liquid crystal display device in Example 3 was slightly lower than that in Example 1 as the haze value in Example 3 was higher than that in Example 1. However, the visibility of the image in Example 3 was acceptable for practical use.

Example 4

In the step (1-1) described above, the amount of a dispersion of the metal oxide particles (P1) produced in Production Example 1 was changed to 10.0 parts by weight. In the step (1-3) described above, the thickness of the antistatic layer was changed to 4.6 μm by adjusting the application thickness of the antistatic agent (A1). In the same manner as in Example 1 except for the above-described matters, the production and evaluation of an antistatic film, and the production and evaluation of a liquid crystal display device were carried out.

In Example 4, the refractive index of the antistatic layer decreased due to the decreased density of the metal oxide particles (P1). Thus, unevenness in in-plane interference was found in an image on the liquid crystal display device, but such unevenness was acceptable for practical use.

Example 5

In the step (1-1) described above, the amount of the dispersion of the metal oxide particles (P1) produced in Production Example 1 was changed to 50.0 parts by weight. In the same manner as in Example 1 except for the above-described matter, the production and evaluation of an antistatic film, and the production and evaluation of a liquid crystal display device were carried out.

In Example 5, the refractive index of the antistatic layer increased due to the increased density of the metal oxide particles (P1). Thus, unevenness in in-plane interference was found in an image on the liquid crystal display device, but such unevenness was acceptable for practical use.

Example 6

In the step (1-3) described above, the relative humidity in application of the antistatic agent (A1) was changed to 70%. In the same manner as in Example 1 except for the above-described matter, the production and evaluation of an antistatic film, and the production and evaluation of a liquid crystal display device were carried out.

In Example 6, fractures of the antistatic layer were found in the regions within 50 mm from the edges of the antistatic layer in the application width direction, although the fractures were sparse. Due to these sparse fractures, the visibility of an image on the liquid crystal display device decreased, but such visibility was acceptable for practical use.

Example 7

In the step (1-3) described above, the relative humidity in application of the antistatic agent (A1) was changed to 39%. In the same manner as in Example 1 except for the above-described matter, the production and evaluation of an antistatic film, and the production and evaluation of a liquid crystal display device were carried out.

Example 7 showed good results similarly to Example 1 for both the visibility of an image on the liquid crystal display device and the stability of liquid crystal driving.

Example 8

In the step (1-2) described above, the thickness of the substrate film was changed to 25 μm by reducing the thickness of a prestretched film by narrowing the lip gap of the multi-manifold die. In addition, in the step (1-3) described above, the thickness of the antistatic layer was changed to 3.0 μm by adjusting the application thickness of the antistatic agent (A1). In the same manner as in Example 1 except for the above-described matters, the production and evaluation of an antistatic film, and the production and evaluation of a liquid crystal display device were carried out.

In Example 8, with regard to the stability of liquid crystal driving of the liquid crystal display device, slight unevenness in liquid crystal driving due to outside light was found, but such unevenness was acceptable for practical use.

Example 9

In the step (1-2) described above, the thermoplastic resin (COP1) containing a polymer having an alicyclic structure was used as a resin for forming the intermediate layer in place of the melted thermoplastic resin (J1) containing an ultraviolet absorber. In the same manner as in Example 1 except for the above-described matter, the production and evaluation of an antistatic film, and the production and evaluation of a liquid crystal display device were carried out.

In Example 9, with regard to the stability of liquid crystal driving of the liquid crystal display device, the response of liquid crystal driving was sometimes delayed to leave an afterimage.

Example 10

In the step (1-2) described above, a resin composition (J2) containing 14.3% by weight of an ultraviolet absorber was produced in place of the resin composition (J1) by changing the amount of a benzotriazole-based ultraviolet absorber from 5.5 parts to 15 parts. The resin composition (J2) was used to produce a stretched film. The stretched film had an in-plane retardation of 100 nm at a measurement wavelength of 550 nm and had a light transmittance of 0.01% at a measurement wavelength of 380 nm. In the same manner as in Example 1 except for the above-described matter, the production and evaluation of an antistatic film, and the production and evaluation of a liquid crystal display device were carried out.

In Example 10, an image on the liquid crystal display device showed a slight yellow tint.

Comparative Example 1

In the step (1-1) described above, the dispersion of the metal oxide particles (P1) produced in Production Example 1 was not used. In the step (1-3) described above, the thickness of the antistatic layer was changed to 4.4 by adjusting the application thickness of the antistatic agent (A1). In the same manner as in Example 1 except for the above-described matters, the production and evaluation of an antistatic film, and the production and evaluation of a liquid crystal display device were carried out.

In Comparative Example 1, significant unevenness in liquid crystal driving of the liquid crystal display device was found.

Comparative Example 2

In the step (1-3) described above, the thickness of the antistatic layer was changed to 0.9 μm by adjusting the application thickness of the antistatic agent (A1). In the same manner as in Example 1 except for the above-described matter, the production and evaluation of an antistatic film, and the production and evaluation of a liquid crystal display device were carried out.

In Comparative Example 2, significant unevenness in liquid crystal driving of the liquid crystal display device was found.

Comparative Example 3

In the step (1-3) described above, the thickness of the antistatic layer was changed to 11.5 μm by adjusting the application thickness of the antistatic agent (A1). In the same manner as in Example 1 except for the above-described matter, the production and evaluation of an antistatic film, and the production and evaluation of a liquid crystal display device were carried out.

In Comparative Example 3, the visibility of an image on the liquid crystal display device was significantly reduced by haze.

[Results]

The results of Examples and Comparative Examples described above are shown below in Tables 1 to 3. In Tables described below, the abbreviations denote the following meanings.

UV Transmittance: the light transmittance of the substrate film at a measurement wavelength of 380 nm.

SnO—Sb: antimony-doped tin oxide particles coated with silica.

Number of fractures: the number of fractures each of which having an area of 5 mm$^2$ or larger of the antistatic layer in both regions within 50 mm from the edges of the antistatic layer in the application width direction, and the number being counted was per both the regions each having 1 meter length.

TABLE 1

Results of Examples 1 to 4

| | | Ex. 1 | Ex. 2 | Ex. 3 | Ex. 4 |
|---|---|---|---|---|---|
| Substrate film | Thickness (μm) | 47 | 47 | 47 | 47 |
| | UV transmittance (%) | 0.02 | 0.02 | 0.02 | 0.02 |
| Antistatic layer | Metal oxide particles | SnO—Sb | SnO—Sb | SnO—Sb | SnO—Sb |
| | Surface resistance (Ω/sq.) | $2.4 \times 10^8$ | $5.0 \times 10^9$ | $2.5 \times 10^7$ | $7.0 \times 10^9$ |
| | Refractive index | 1.53 | 1.53 | 1.53 | 1.51 |
| | Thickness (μm) | 4.5 | 1.2 | 11.0 | 4.6 |
| Antistatic film | Haze value (%) | 0.02 | 0.02 | 0.29 | 0.05 |
| | Transmission hue L* | 95.6 | 96.2 | 93.5 | 95.4 |
| | Number of fractures | 0 | 0 | 3 | 0 |
| Humidity of application atmosphere (% RH) | | 50 | 50 | 50 | 50 |
| Display visibility | | 3 | 3 | 3 | 3 |
| LC driving stability | | 3 | 3 | 3 | 3 |

TABLE 2

Results of Examples 5 to 8

| | | Ex. 5 | Ex. 6 | Ex. 7 | Ex. 8 |
|---|---|---|---|---|---|
| Substrate film | Thickness (μm) | 47 | 47 | 47 | 25 |
| | UV transmittance (%) | 0.02 | 0.02 | 0.02 | 1.6 |
| Antistatic layer | Metal oxide particles | SnO—Sb | SnO—Sb | SnO—Sb | SnO—Sb |
| | Surface resistance (Ω/sq.) | $3.0 \times 10^8$ | $7.0 \times 10^8$ | $3.0 \times 10^8$ | $5.0 \times 10^9$ |
| | Refractive index | 1.54 | 1.53 | 1.53 | 1.53 |
| | Thickness (μm) | 4.5 | 4.5 | 4.5 | 3.0 |

TABLE 2-continued

Results of Examples 5 to 8

|  |  | Ex. 5 | Ex. 6 | Ex. 7 | Ex. 8 |
|---|---|---|---|---|---|
| Antistatic film | Haze value (%) | 0.25 | 0.28 | 0.02 | 0.02 |
|  | Transmission hue L* | 93.2 | 93.0 | 95.6 | 95.3 |
|  | Number of fractures | 4 | 9 | 0 | 0 |
| Humidity of application atmosphere (% RH) |  | 50 | 70 | 39 | 50 |
| Display visibility |  | 3 | 2 | 3 | 3 |
| LC driving stability |  | 3 | 3 | 3 | 3 |

TABLE 3

Results of Examples 9 to 10 and Comparative Examples 1 to 3

|  |  | Ex. 9 | Ex. 10 | Comp. Ex. 1 | Comp. Ex. 2 | Comp. Ex. 3 |
|---|---|---|---|---|---|---|
| Substrate film | Thickness (μm) | 47 | 47 | 47 | 47 | 47 |
|  | UV transmittance (%) | 85 | 0.01 | 0.02 | 0.02 | 0.02 |
| Antistatic layer | Metal oxide particles | SnO—Sb | SnO—Sb | — | SnO—Sb | SnO—Sb |
|  | Surface resistance (Ω/sq.) | $5.0 \times 10^9$ | $2.4 \times 10^8$ | $1.0 \times 10^{14}$ | $5.0 \times 10^{10}$ | $1.5 \times 10^7$ |
|  | Refractive index | 1.53 | 1.53 | 1.48 | 1.52 | 1.49 |
|  | Thickness (μm) | 4.5 | 4.5 | 4.4 | 0.9 | 11.5 |
| Antistatic film | Haze value (%) | 0.02 | 0.28 | 0.02 | 0.02 | 0.31 |
|  | Transmission hue L* | 95.6 | 92.5 | 96.0 | 96.3 | 93.2 |
|  | Number of fractures | 0 | 0 | 0 | 0 | 7 |
| Humidity of application atmosphere (% RH) |  | 50 | 50 | 50 | 50 | 50 |
| Display visibility |  | 3 | 2 | 3 | 3 | 1 |
| LC driving stability |  | 2 | 3 | 1 | 1 | 3 |

[Discussions]

All of the antistatic films produced in Examples are found to have good antistatic properties because of the small surface resistance of the antistatic layer. All of the antistatic films produced in Examples are also found to have high transparency because of their low haze value. It is thus confirmed that the present invention provides antistatic films having both high transparency and good antistatic properties.

Liquid crystal display devices each including any one of the antistatic films produced in these Examples achieve both good image visibility and high stability of liquid crystal driving. Therefore, the present invention can improve both the visibility of an image on a liquid crystal display device and the stability of liquid crystal driving, which indicates that the present invention can effectively improve the image quality of a liquid crystal display device.

With particular reference to Example 3, slight fractures are formed in both regions within 50 mm from the edges of the antistatic layer in the application width direction in Example 3. The number of fractures in Example 3 is larger than that in other Examples probably because of the following reason: a thick antistatic layer results in a large number of metal oxide particles in the antistatic layer and thus results in a high degree of agglomeration of the metal oxide particles.

With reference to Example 2, the thickness of the antistatic layer was reduced to 1.2 μm, which increased the surface resistance and slightly caused driving unevenness due to electrical charging at the time of liquid crystal driving in a mounted state in Example 2. It is presumed that increased surface resistance leads to a large amount of electrical charges on the liquid crystal cell and thus causes driving unevenness.

With particular reference to Example 6, fractures are formed in both regions within 50 mm from the edges of the antistatic layer in the application width direction in Example 6. The number of fractures in Example 6 is larger than that in other Examples probably because the humidity of the atmosphere at the time of application of the antistatic agent (A1) was high so that the antistatic agent (A1) absorbed a large amount of moisture and that promoted agglomeration of the metal oxide particles in the antistatic agent (A1).

Furthermore, with particular reference to Example 8, it is found that the antistatic film can be prevented from curling by appropriately adjusting the thickness of the antistatic layer even when the substrate film is thin.

With particular reference to Example 9, a delay in the response of liquid crystal driving was observed in Example 9. It is presumed that, since the substrate film in Example 9 was free of an ultraviolet absorber, the liquid crystal molecules contained in the liquid crystal cell were damaged by ultraviolet rays, which caused a delay in the response of liquid crystal driving.

With particular reference to Example 10, an increase in the amount of the ultraviolet absorber results in an increase in haze value and a decrease in transmission hue L*. The image is found to show a slight yellow tint.

DESCRIPTION OF NUMERALS

100: antistatic film

110: substrate film

120: antistatic layer

120L, 120R: edges of the antistatic layer in the application width direction X

120U: surface of the antistatic layer

121, 122: regions near both edges of the antistatic layer in the application width direction X

The invention claimed is:

1. An antistatic film comprising:
   a substrate film made of a thermoplastic resin containing a polymer including an alicyclic structure; and
   an antistatic layer provided on the substrate film, the layer containing electroconductive metal oxide particles,
   wherein the antistatic layer has a surface resistance of $1.0 \times 10^6$ Ω/sq. or more and $1.0 \times 10^{10}$ Ω/sq. or less,
   the antistatic film has a total haze value of 0.3% or less, and
   a number of fractures each of which having an area of 5 mm$^2$ or larger of the antistatic layer in both regions within 50 mm from edges of the antistatic layer in an application width direction is less than 10 per both the regions each having 1 meter length.

2. The antistatic film according to claim 1, wherein
   the antistatic layer has a monolayer structure, and
   the antistatic layer has a thickness of 1.5 μm to 10.0 μm.

3. The antistatic film according to claim 1, wherein the antistatic film has a transmission hue L* of 94 to 97.

4. The antistatic film according to claim 1, wherein the antistatic layer has a refractive index of 1.50 to 1.55.

5. The antistatic film according to claim 1, wherein
   the substrate film includes a first surface layer, an intermediate layer, and a second surface layer in this order,
   the intermediate layer contains an ultraviolet absorber,
   the substrate film has a thickness of 10 μm or more and 60 μm or less, and
   the substrate film has a light transmittance of 10% or less at a wavelength of 380 nm.

6. A liquid crystal display device comprising:
   a liquid crystal cell;
   a polarizer provided on a viewing side of the liquid crystal cell; and
   the antistatic film according to claim 1 provided on a viewing side of the polarizer,
   wherein the antistatic film includes the substrate film and the antistatic layer in this order from the proximity of the polarizer.

7. The liquid crystal display device according to claim 6, comprising an ultraviolet-curable adhesive agent layer between the polarizer and the antistatic film.

8. The liquid crystal display device according to claim 6, wherein the liquid crystal cell is an IPS liquid crystal cell.

9. The antistatic film according to claim 1, wherein the metal oxide particles are connected to each other in a form of a chain to form chain-connected bodies, and the average number of the connected metal oxide particles is 2 or more and 20 or less.

10. The antistatic film according to claim 1, wherein the metal oxide particles are modified with a hydrolysis product of the organosilicon compound, wherein the organosilicon compound is hydrolyzed under such conditions that the weight ratio of the organosilicon compound relative to the metal oxide particles (organosilicon compound/metal oxide particles) is 0.3 or lower.

11. A method for producing the antistatic film according to claim 1, comprising:
    applying an antistatic agent containing metal oxide particles onto a substrate film to form the antistatic layer,
    wherein the antistatic agent comprises an ethanol mixture that is a mixture of ethanol, normal propyl alcohol, methanol, and water.

12. A method for producing the antistatic film according to claim 1, comprising:
    applying an antistatic agent containing metal oxide particles onto a substrate film in an environment having a relative humidity of 45% RH or higher and 60% RH or lower to form the antistatic layer.

* * * * *